US011809593B2

(12) United States Patent
Irish et al.

(10) Patent No.: US 11,809,593 B2
(45) Date of Patent: Nov. 7, 2023

(54) SENSITIVE DATA COMPLIANCE MANAGER

(71) Applicant: Spirion, LLC, St. Petersburg, FL (US)

(72) Inventors: Liam Irish, Tampa, FL (US); Tizanae C. Nziramasanga, Seffner, FL (US); Gabe Gumbs, St. Petersburg, FL (US); Kyle H. N. Butler, St. Petersburg, FL (US)

(73) Assignee: Spirion, LLC, St. Petersburg, FL (US)

(*) Notice: Subject to any disclaimer, the term of this patent is extended or adjusted under 35 U.S.C. 154(b) by 5 days.

(21) Appl. No.: 17/180,597

(22) Filed: Feb. 19, 2021

(65) Prior Publication Data

US 2021/0264056 A1 Aug. 26, 2021

Related U.S. Application Data

(60) Provisional application No. 62/979,053, filed on Feb. 20, 2020.

(51) Int. Cl.
*G06F 21/62* (2013.01)
*G06F 16/242* (2019.01)

(52) U.S. Cl.
CPC ...... *G06F 21/6245* (2013.01); *G06F 16/2428* (2019.01); *G06F 21/6227* (2013.01)

(58) Field of Classification Search
None
See application file for complete search history.

(56) References Cited

U.S. PATENT DOCUMENTS

| | | | | |
|---|---|---|---|---|
| 11,238,176 B1* | 2/2022 | Vax | ..................... | G06F 16/2457 |
| 2014/0136941 A1* | 5/2014 | Avrahami | ........... | G06F 21/6245<br>715/229 |
| 2019/0179490 A1* | 6/2019 | Barday | ................. | G06F 3/0484 |
| 2019/0286839 A1* | 9/2019 | Mutha | ..................... | G06F 16/29 |
| 2020/0050966 A1* | 2/2020 | Enuka | .................... | G06N 5/025 |
| 2020/0184104 A1* | 6/2020 | Barday | ................... | G06F 21/31 |

* cited by examiner

*Primary Examiner* — Meng Li
*Assistant Examiner* — Felicia Farrow
(74) *Attorney, Agent, or Firm* — Eubanks PLLC

(57) ABSTRACT

Techniques for finding and associating personal identifying information with an individual. In one embodiment, a method includes searching a database of personal identifying information held by an organization for instances of a particular item of personal identifying information of a data subject. The database may link personal identifying information to locations at which that personal identifying information is held by the organization. After a storage location with a found instance of the particular item of personal identifying information of the data subject is determined, additional personal identifying information of potential relevance to the data subject may be found at the storage location and used for further searching of the database for more personal identifying information of potential relevance to the data subject at other locations. Personal identifying information may be associated with the data subject and included in a data subject profile.

17 Claims, 23 Drawing Sheets

| FIRST NAME | LAST NAME | SOCIAL SECURITY NUMBER | ACCT. NUMBER | PHONE NUMBER | E-MAIL ADDRESS |
|---|---|---|---|---|---|
| JOHN | ROE | 911-22-3333 | 878.2354.11 | 678-555-2345 | JOHN.SMITH@LOREMMAIL.COM |
| JANE | DOE | 922-33-4444 | 248.7754.08 | 243-734-5555 | JANE.DOE@IPSUMMAIL.COM |

SENSITIVE DATA COMPLIANCE MANAGER

CROSS-REFERENCE TO RELATED APPLICATIONS

This application claims the benefit of U.S. Provisional Patent Application No. 62/979,053, filed on Feb. 20, 2020, which is incorporated by reference herein in its entirety.

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

Personal data gathered from both employees and customers can spread throughout the system of a company as it grows. As it adds more employees for different or more distinct roles, the amount of people that can access certain data grows. This can leave at minimum a temp file within their system or save a full file of something that they downloaded or were working on.

Data is essential for organizations to operate in the modern business landscape. Data is needed on their organization, their competitors, and their customers. Other data can be inadvertently collected in the process of gathering the data. Data is an ever-increasing asset, crossing traditional boundaries between on-premises and in-cloud services. It does not remain constant or stay put. In addition, low-cost storage options and the cloud are accelerating data sprawl by making it easier for companies to hold on to all their data—whether they need it or not.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Certain embodiments of the present disclosure generally relate to systems and methods of ingesting, searching, and analyzing disparate identifying entities, such as personal identifying information or other sensitive data, to facilitate understanding and exploration of subjects represented by these identifying entities. In some instances, such systems and methods may be used by an organization as a compliance management tool to facilitate compliance with data privacy regulations and facilitate response to subject rights requests received from individuals. In one embodiment, known personal identifying information of a data subject is used to search a database having personal identifying information held by an organization linked to the locations at which the personal identifying information is held. Locations identified as having the known personal identifying information may have additional personal identifying information that may be related to the data subject and may be used in further searching of the database for still further additional personal identifying information potentially related to the data subject. An interactive dashboard may be provided to facilitate exploration and analysis of locations and personal identifying information by a human user, such as a privacy analyst for an organization. Personal identifying information determined to be related to the data subject can be added to a profile for the data subject.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Data proliferation is the concept that there is an unprecedented amount of data, both structured and unstructured, generated by organizations through a variety of activities. This can occur through the intended use of an organization's systems, like through e-mail and databases containing customer/employee data. It can also occur unintendedly through these same systems. Customers can enter data in the wrong dialog box or send personal identifying information (PII) via unsecured methods among many other methods.

Figure 1:
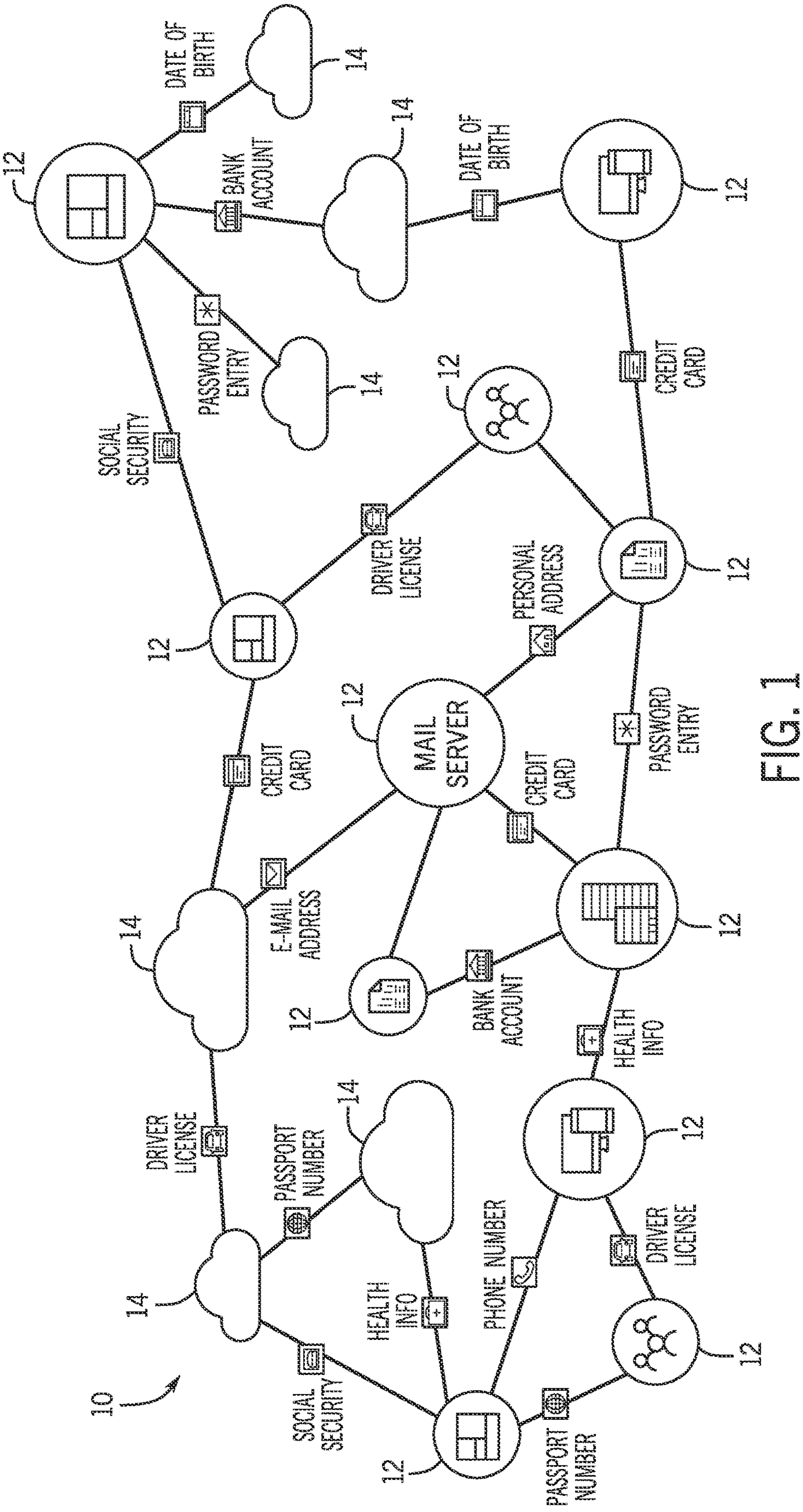
FIG. 1 generally depicts data proliferation in a computing enterprise in accordance with one embodiment of the present disclosure.
Figures 2, 3:
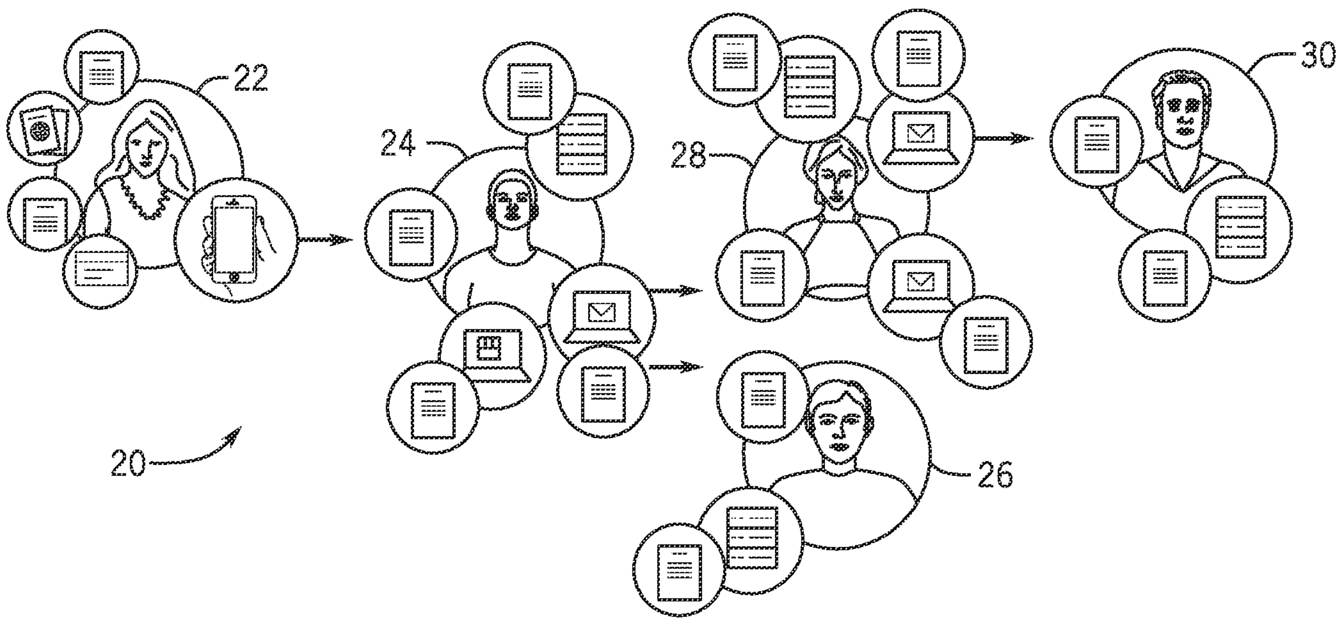
FIG. 2 generally depicts another example of data proliferation in an organization in accordance with one embodiment.
FIG. 3 generally depicts a database of subjects and known identifying data elements of the subjects in accordance with one embodiment.

Turning now to the present figures, FIG. 1 shows data proliferation in a computing enterprise 10, in which data is communicated from and between nodes 12 (e.g., computers, applications, users, facilities, mail servers, document servers, and files) and cloud services or platforms 14 (e.g., computing services, storage services, productivity services, networking services, and backup services). Another real-world example is generally illustrated in FIG. 2. In this example, a job applicant 22 applies for and secures a job at a corporation. She fills out a new hire package, including a new employee form, her Form I-9 with her passport and driver's license, as well as her benefits information for herself and her family. She takes a picture of the forms and documents with a scanning app on her phone and e-mails the combined PDF to the company recruiter 24 in Human Resources (HR). The company recruiter 24 receives it, saves a copy to his file store for safe keeping, keys the information into a spreadsheet for new hires, and forwards the e-mail with all attachments and the spreadsheet to his boss 26 and the hiring manager 28, bcc'ing himself so he can save the file in his e-mail. The hiring manager 28 sends to her admin 30, but also saves to her local store. All that data is backed up (e.g., in local or cloud file backups), so in a matter of minutes, more than a dozen copies of the private information of job applicant 22—including that of her family—has found its way throughout the enterprise.

With more privacy laws being introduced worldwide, companies have been challenged to demonstrate both knowledge and control over the PII data that they store pertaining to individuals ("data subjects"). Current laws and regulations (California Consumer Privacy Act (CCPA), General Data Protection Regulation (GDPR), etc.) allow consumers to take the onus of their data. They can reach out to organizations that they believe to be in possession of their data and, through subject rights requests, demand that the organization take several different actions. One action, depending on the law or regulation, empowers consumers to ask for a copy of their data (e.g., PII) the organization has processed within a specified timeframe.

Each of the actions that regulation has demanded an organization take forces the organization to have a thorough accounting of the data they possess and where they obtained it. If an organization unknowingly does not fully comply with regulation, they face steep fines and penalties. For this reason, an organization may associate the data they process with a data subject to help them fully comply with regulation and complete each subject rights request fully.

Some attempts at mining data for a subject's identity may require the identifying data elements of the subject to be previously known. For example, as generally depicted in FIG. 3, known identifying data elements may be provided in a database in which each row contains a discrete subject and each column contains the data element related to the subject. While a small number of rows and columns are depicted in FIG. 3 by way of example, it will be appreciated that a database may include many more rows of subjects and many more (or other) columns of related data elements.

Figure 4:
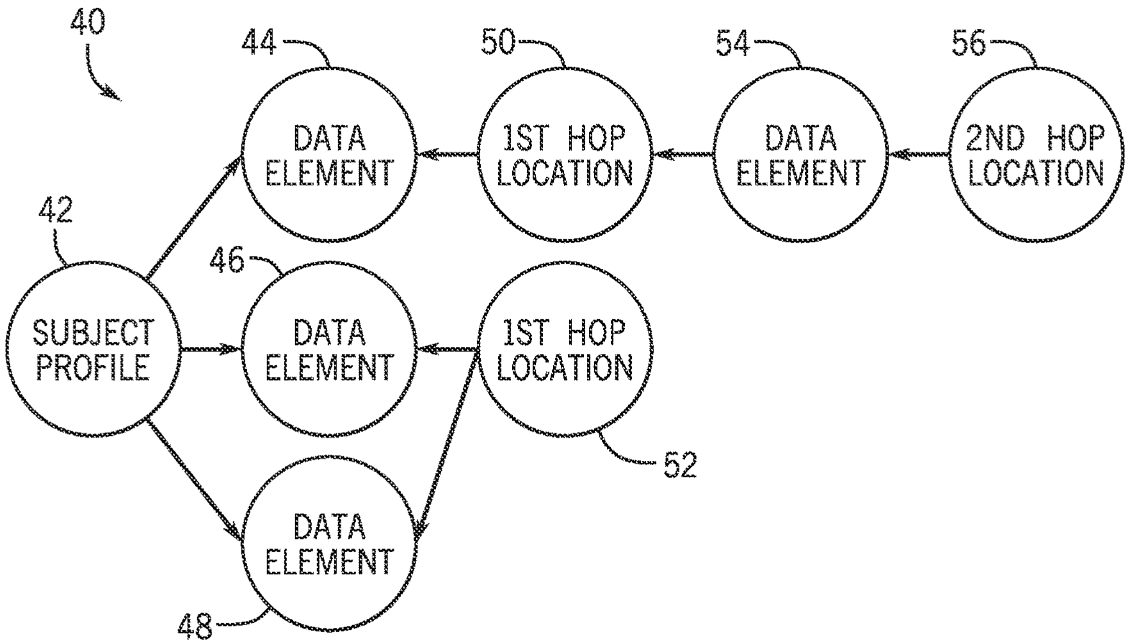
FIG. 4 is a graph representing relationships between a data subject profile, data elements, and data locations in accordance with one embodiment.

Other short comings of some existing approaches only account for the nearest relationships between data elements and their locations; in practice, such approaches may not extend beyond the first immediate hop of data locations. With reference to graph 40 in FIG. 4, for instance, a data subject profile 42 may include data elements 44, 46, and 48 also present in first hop locations 50 and 52. As one example, the data element 44 may be a subject name found in the first hop location 50 (e.g., an employee or contractor tax form), and the data elements 46 and 48 may be an address and employee identification number found in the first hop location 52 (e.g., a building security form). In at least some embodiments of the present technique, however, additional data elements (e.g., data element 54) found within the first hop locations may be used to locate and search additional hop locations (e.g., second hop location 56) for data that may be associated with a data subject for possible inclusion in the data subject profile 42. For instance, the data element 54 could be a social security number of the subject, and that social security number may be present in both a tax form (e.g., first hop location 50) and a pay stub (e.g., second hop location 56) for the subject. The second hop location 56 can be searched for additional data elements, which may lead to still further hop locations (e.g., third hop locations) that may themselves include still more data elements of potential relevance. In accordance with some embodiments, a method includes finding new locations of potential relevance to a subject through connections (e.g., data elements in common) of the new locations to known relevant locations and searching for additional data entities in the new locations that may be relevant to the subject. The finding of new locations and searching for additional data entities in the new locations may be repeated for each new location and additional data entity found (with the discovery of each new location or data entity potentially leading to still more locations or data entities of interest).

Poor approaches at data discovery can also cause attempts at associating a subject with their data to suffer from inaccuracy in building subject profiles. In order to accurately create a subject profile, the data associated with the subject must first be discovered. Failure to accurately discover and identify all of a subject's data (False Negatives) or finding data that is not related to the subject (False Positives) may lead to incomplete and incorrect subject profiles. When discovering sensitive data (e.g., PII) within structured and unstructured information repositories, there is always a possibility that data may incorrectly match types of data sought. At least some existing solutions lack False-Positive-mitigation techniques; rely primarily on simple pattern matching techniques that do not account for algorithms, checksums, and ranges within a wide variety of data types; do not consistently identify and check the context of potential matches to determine the certainty of a match being a True Positive instead of a False Positive; and do not allow for the customization of data types and patterns to adapt to data specific to an organization.

Figure 5:
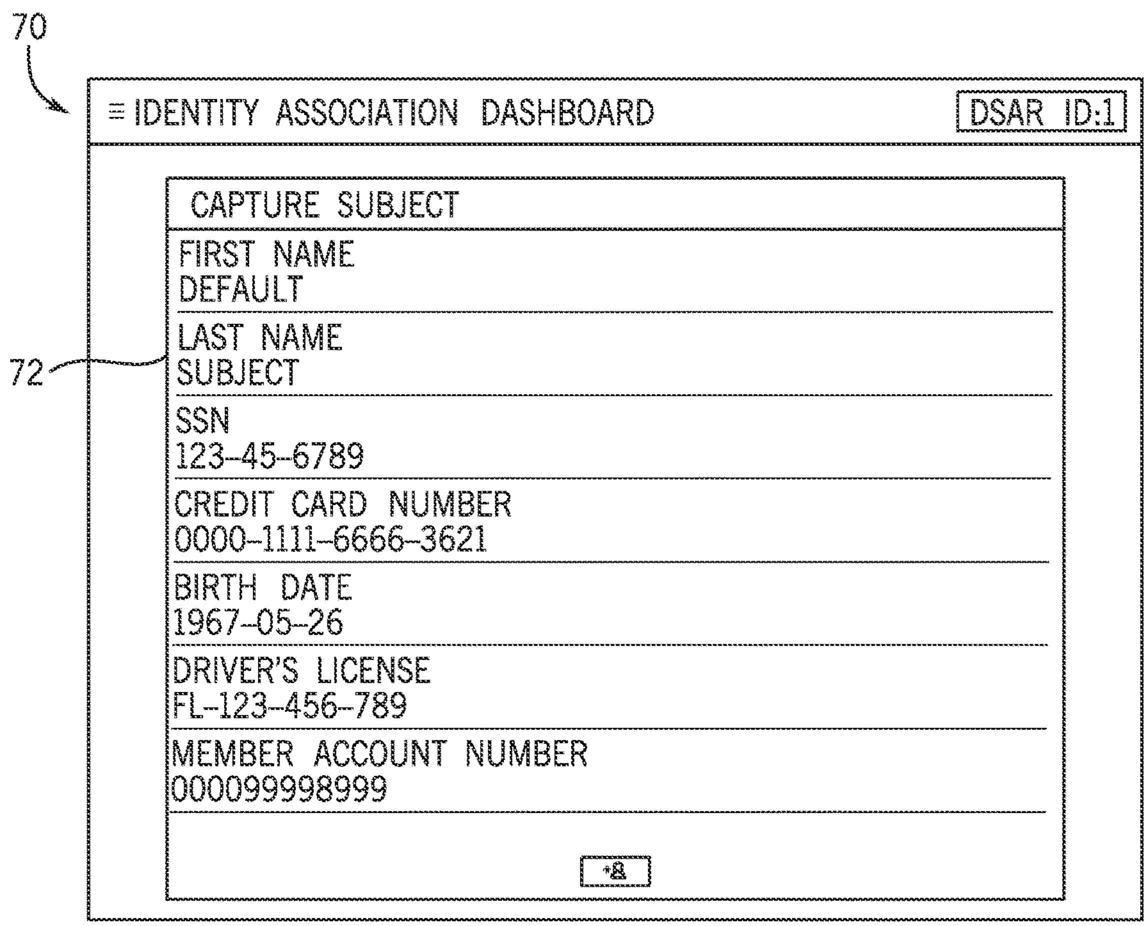
FIG. 5 is a dashboard screen having a sample subject profile with known details about the subject in accordance with one embodiment.

An example of a dashboard screen 70 that may be displayed to facilitate user interaction is depicted in FIG. 5 in accordance with one embodiment as having a sample subject profile 72. A subject is an individual for whom an analysis will be performed. The goal of the analysis is to determine what is known about the subject. The depicted profile 72 captures the known details about the subject. These known details may be provided by the subject or a representative agent. This information may be incomplete, but it has sufficient information to uniquely identify the subject in at least some embodiments. The subject data fields shown in FIG. 5 are only examples. Any additional or other identifying characteristic could be used, including non-textual data, such as biometrics.

Figure 6:
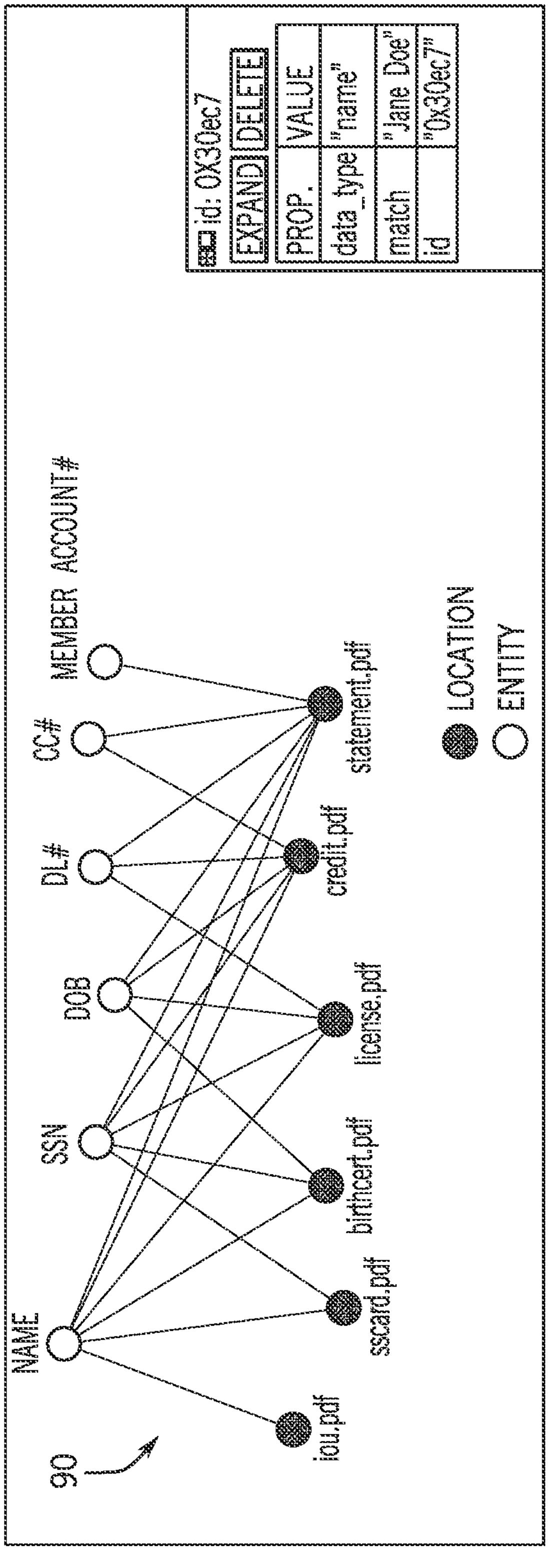
FIG. 6 shows a bipartite graph with data entity matches, locations, and associations for a single subject's profile and a few related documents in accordance with one embodiment.

FIG. 6 shows a simplified example of a bipartite graph 90 in accordance with one embodiment. This graph 90 shows a constellation of data entity matches, locations, and associations in a simple view demonstrating a single subject's profile and a few related documents as an example. A bipartite graph is composed of two parts (i.e., two sets of elements) in which each link (which may also be referred to as an edge) connects an element of one set to an element of the other set, and no element may link with another element in the same part. In FIG. 6, the two parts of the graph 90 are identifying entities (shown as open nodes) and locations (shown as stippled nodes). Identifying entities are personal attributes of an individual that can be used to identify the individual. Examples of identifying entities include name, address, phone number, date of birth, license number, passport number, credit card number, account number, social security number, password, e-mail address, fingerprint, private keys, hash codes, cryptocurrency addresses, and access tokens. A location is a set of coordinates that can be used to find data within an organization, such as a file server name and a filesystem path, or a database server, database name, table, row, and column. This simplified example shows identifying entities from profile 72 of FIG. 5 and locations where those entities were found. Each entity, such as Name, can be found in many locations. Each location, such as statement.pdf, may contain many entities. Edges (shown as lines in FIG. 6) are drawn between entities and locations in which an entity is found. If a location does not contain an entity, no edge is drawn between them. This forms the basis for identity association. Two disparate identifying elements, such as Name and SSN, are associated through locations they have in common. Association does not directly indicate that an entity identifies another specific element. However, when many associations are drawn between identifying entities through common locations, the relevancy of an entity to a profile is increased.

FIG. 6 shows an example limited to locations that are a priori known to be relevant to the profile 72 in FIG. 5. With such a deterministic example, the reader can clearly see how a document such as a social security card would contain the name and social security number of the individual described by the profile.

Figure 7:
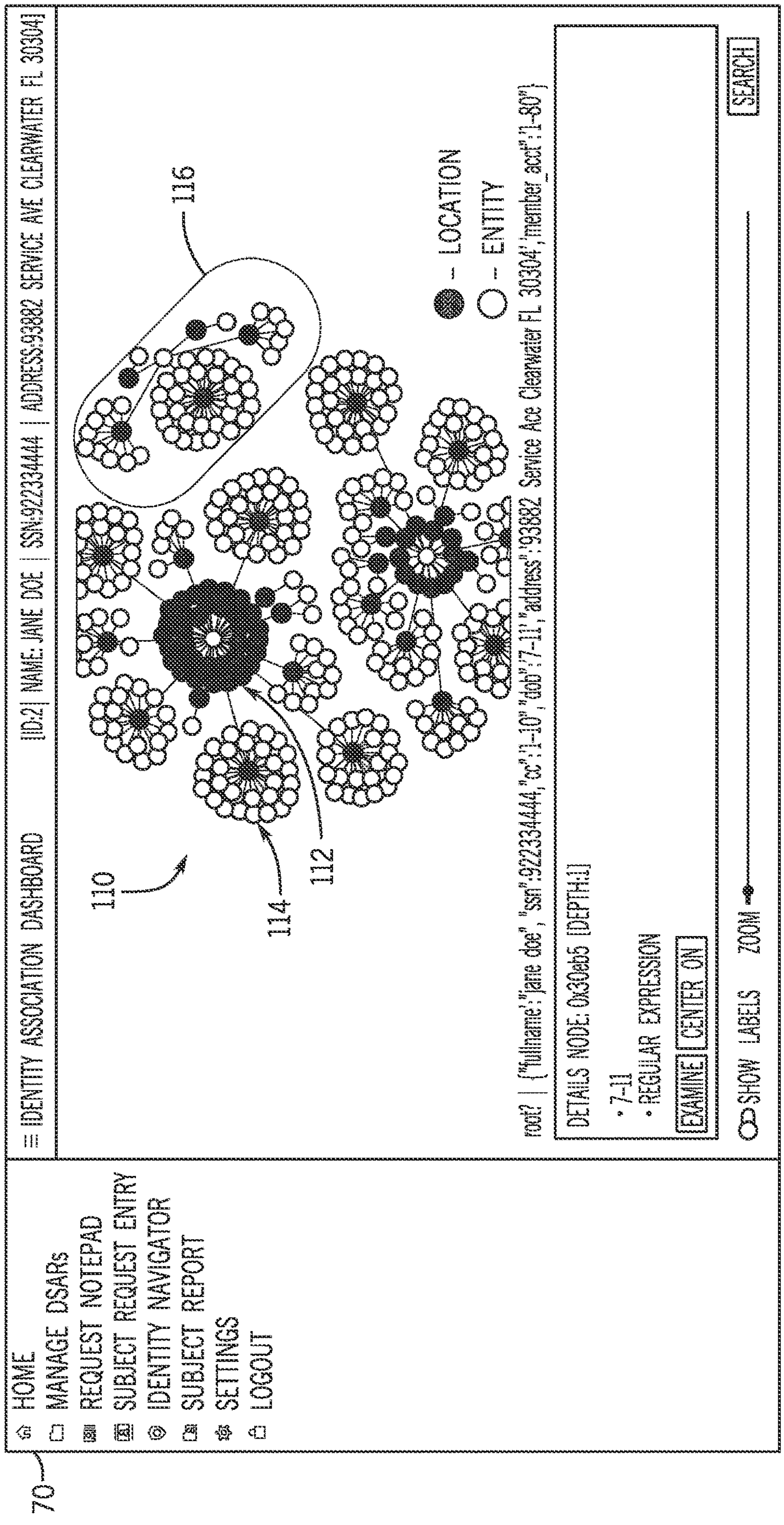
FIG. 7 shows a more complex bipartite graph of identity associations for a subject with various combinations of data entities and locations presented in a dashboard screen in accordance with one embodiment.

FIG. 7 shows a more complex network view of identity associations, with a bipartite constellation graph 110 showing various combinations of data entities and locations presented in a dashboard screen 70 in accordance with one embodiment. In practice, a human user (e.g., an analyst) may come upon documents of various types. Humans are capable of complex visual processing with minimal effort. The constellation graph 110 shows dozens of data entities (represented by open nodes) and locations (represented by heavily stippled nodes). This visual representation allows an analyst to quickly break down the elements into several types. The graph 110, for instance, includes a cluster 112 having a single data entity surrounded by many locations. This might indicate the entity in the cluster 112 is being used as a key, such as an account number or a social security number. The graph 110 also shows a cluster 114 having a single location surrounded by many entities. This might indicate a report or spreadsheet with many names or account numbers. While the location in the cluster 114 might contain details about the subject, it also likely contains many unrelated details.

A partition in the network is generally represented by reference numeral 116 in FIG. 7. These entities and locations within the partition 116 are disconnected from the other entities and locations. Partitions 116 indicate a lack of association. The data elements (data entities and locations) in this partitioned cluster are related to each other, but not to the other clusters. This might be the case for organizationally disparate data, such as human resources (HR) data vs. information technology (IT) data.

Figure 8:
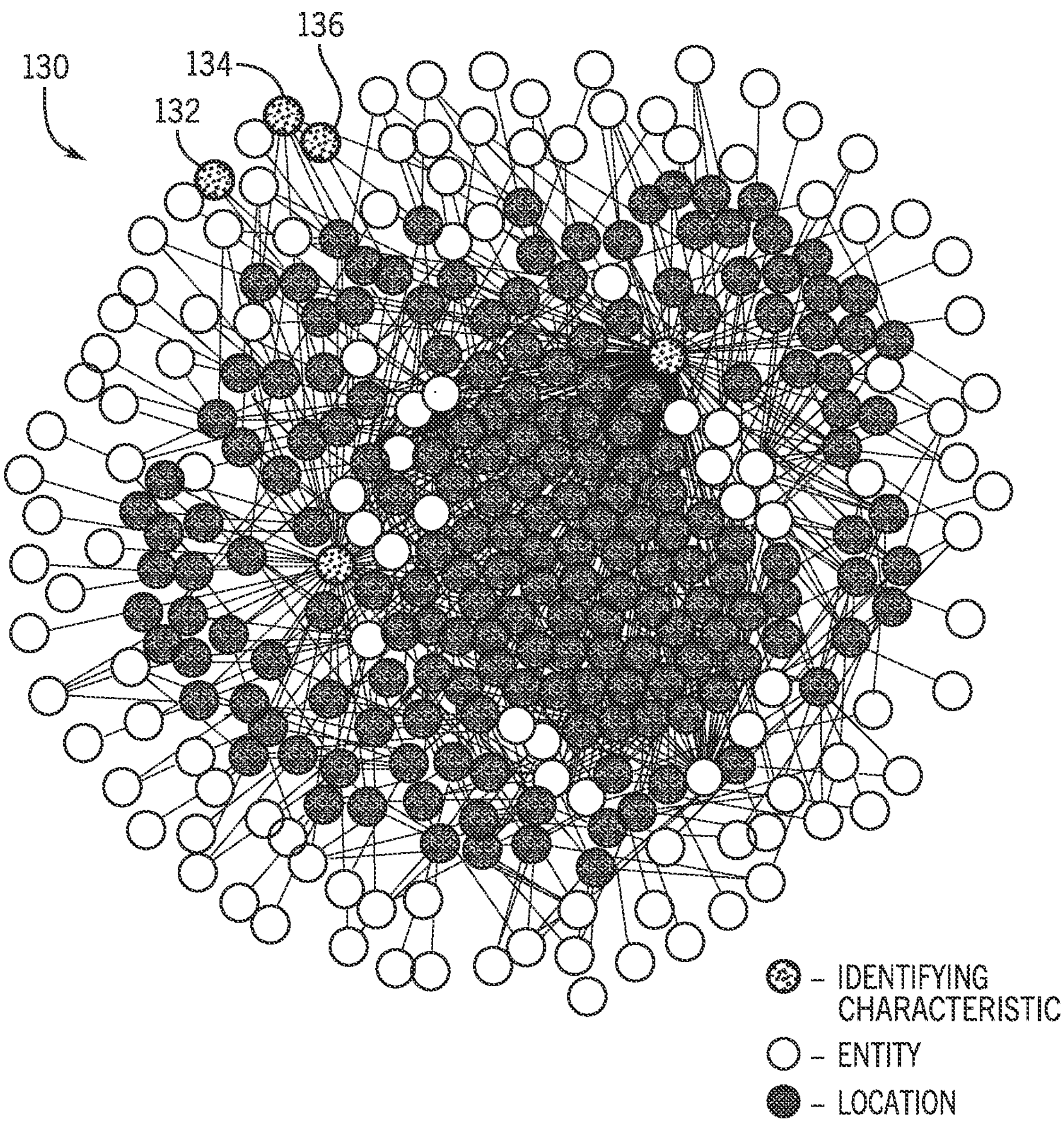
FIG. 8 is another bipartite graph, in which nodes represent identifying characteristics provided by a subject, other data entities, and locations containing data entities, in accordance with one embodiment.

By way of further example, FIG. 8 shows a noisier network view with a bipartite graph cluster. In this depicted constellation graph 130, details provided by or for the subject (identifying characteristics) are represented by lightly stippled nodes. A skilled user can quickly summarize this graph and determine where to investigate. The graph shows many locations (represented by heavily stippled nodes) containing identifying entities (represented by open nodes). Common attributes are pulled toward the middle of the cluster. The lightly stippled nodes (identifying characteristics) close to the center of the cluster are found in many locations. While these locations are relevant to the subject, they probably do not provide much additional information. The lightly stippled nodes 132, 134, and 136 (their position on the periphery of the cluster representing rarer attributes) are drawn close to each other, and close to several locations. These close locations are more likely to be related to the subject and to belong in a report. Furthermore, they may contain additional identifying characteristics not reported by the subject, such as previous addresses.

Figure 9:
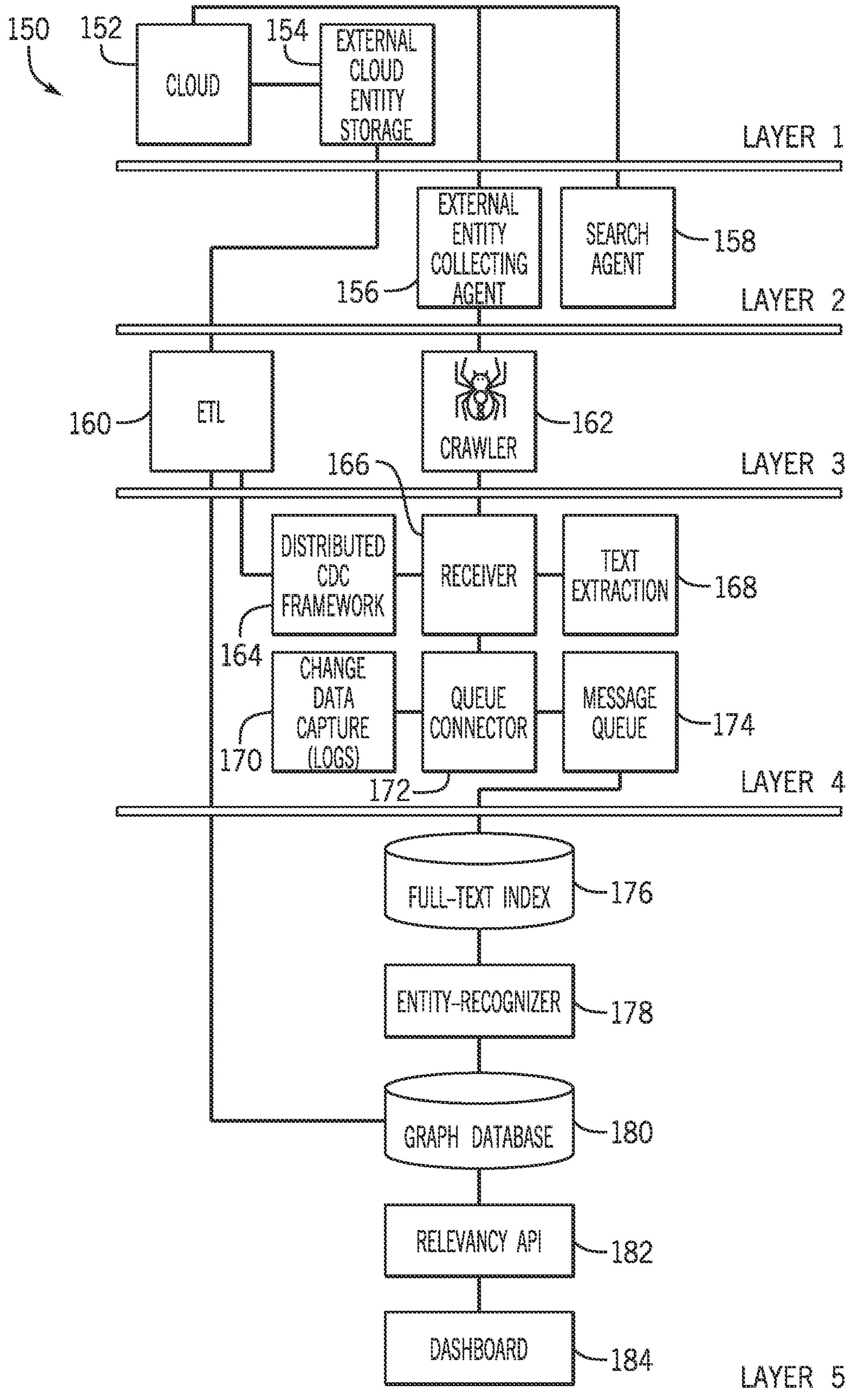
FIG. 9 depicts a data flow tiered architecture for identity association, searching, and reporting in accordance with one embodiment.

A data flow tiered architecture 150 is represented in FIG. 9 in accordance with one embodiment. This figure includes containers aligned based on the way data flows through them, from top to bottom, and shows the logical flow of data from top to bottom through the architecture. Layer 1 shows data in an organization, where the data may be on local physical servers (cloud 152) or remote cloud 154 locations. Layer 2 shows collection agents that read data from Layer 1 components. These may include a search agent 158 or other external collecting entity 156. Layer 3 shows data extraction via an ETL (extract, transform, load) process 160 or crawler 162. An ETL process 160 handles data that has already been transformed by other agents, such as agent 158, so it has less work to do and can pass data directly to a graph database 180 (in Layer 5) after transforming it into a compatible format. The crawler 162 process directly accesses data, so the steps it takes are more complex. After reading data from a location, the crawler 162 sends it to a remote receiver process 166 (in Layer 4). The receiver can orchestrate initial preprocessing and storage by the following steps: passing the location data to a text extraction process 168, receiving the extracted data, generating a unique identifier for the extracted data, storing the extracted data in a full-text index 176, and queueing the generated id in the queueing system 172 for processing by other components. The receiver may also inform the initiating crawler 162 of the status of the post. FIG. 9 also depicts Layer 4 as having change data capture (CDC) logs (block 170) and distributed CDC framework (block 164), which are described below with reference to FIG. 10.

Documents stored in the full-text index 176 are available for further processing by humans or agents. Entity recognizer 178 agents monitor a message queue 174 waiting for new documents to be available. When one is, they use the provided id to read the document from the full-text index 176. The entity recognizer 178 scans the documents looking for identifying entities of various kinds, including but not limited to human names, geospatial addresses, and other identifying entities described herein. When the agent discovers identifying entities in a document, it passes the entity and location to the graph database 180. The passed data form a tuple associating the entity with the location. The graph database 180 houses bipartite matches, such as shown in FIG. 6. The process of creating association happens in the ETL 160 and entity recognizer 178 steps. The graph database 180 representation facilitates the querying for information about entities and locations, such as described above.

The Relevancy API 182 bridges between the front end (dashboard 184 in FIG. 9) and graph database 180 components. This includes perfunctory activities, such as user logins and role-based access control. In relation to the problem domain, it facilitates four activities: search of the graph database based on relevancy of locations to a given subject profile; search of the full-text index for context and to ensure no relevant subject information is skipped; addition of relevant subject data discovered via the above searches; and composition of material (locations, classifications, and entities) for reporting and action on subject requests.

The dashboard 184 provides the user interface for analysts to interact with the system. This includes perfunctory activities, such as login and administrative tasks related to the loading of profiles and auditing of the system. The dashboard 184 also includes various visualization components designed to facilitate an analyst's ability to complete requests for subjects. In various embodiments, the dashboard 184 may provide one or more of a graph interface (e.g., a constellation graph); a link-based navigation system, allowing an analyst to explore the dataset one piece at a time; or tabular search results based on the relevancy calculations performed by the Relevancy API 182. In at least one embodiment, the dashboard 184 includes a graph interface with a link-based navigation system to facilitate analyst exploration of a dataset. Dashboard screens 70 discussed herein are examples of screens that may be presented to a user by the dashboard 184, although the dashboard 184 and information output therefrom may be provided in any suitable forms.

Figure 10:
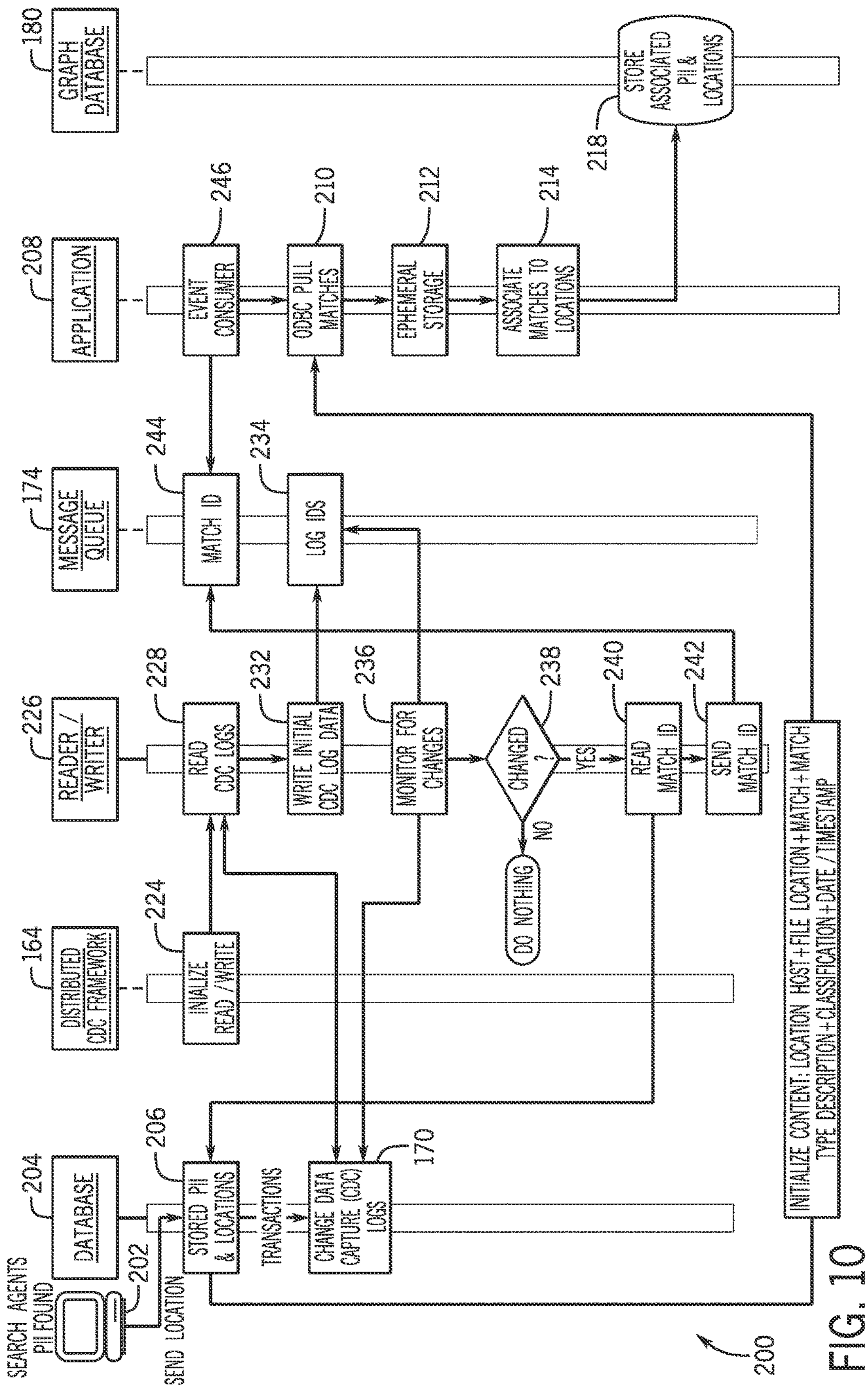
FIG. 10 is a workflow for performing identity association in accordance with one embodiment.

An example workflow 200 that may be used by the ETL process 160 for identity association is depicted in FIG. 10 in accordance with one embodiment. In this embodiment, after the search agents have found PII (generally represented by computer 202), the found PII and locations are stored (block 206) in a database 204 (e.g., a Structured Query Language (SQL) database). The initial startup of the product (application 208) after install will move data (block 210) from the database 204 via an open database connector (ODBC), which data includes the location host, file location, the actual PII match, and the match type description. Using the ODBC, match data is pulled into ephemeral storage (block 212), such as random-access memory, by the application 208. Following this, the associations will be completed within the application 208 (block 214) and then persist that associated data into the graph database 180 (block 218).

The real-time workflow for the product starts at the same time of initializing. The distributed framework tool (CDC framework) 164 turns on change data capture logs (block 170) in the database 204. This turns on an inherent feature within the database 204 to track all the transactions within a table, isolating the matches table to be monitored exclusively. The reader/writer program 226 will read (block 228) those logs 170 and store (block 234) the latest log IDs in the message queue 174. The writing of the initial log data is done during the transfer from block 232 into block 234 in the message queue 174. In summary, the CDC is initialized (block 224), the logs are read (block 228), and they are then written to and stored in the message queue 174 (blocks 232 and 234).

As shown in FIG. 10, constant monitoring is occurring (block 236) and the reader will read the logs that have been turned on in the database. There is a constant polling of the database 204, as well as polling the message queue 174 to identify the last message row that was sent. It continuously checks log IDs in both locations. If the log ID of block 234 being read at block 236 is less than the one that is coming from block 170 (also being read at block 236), something has changed (decision block 238). That is indicated at block 240, where the match IDs of the new rows in the database 204 are pulled. Those match IDs are sent (block 242) into the message queue 174 and persisted at block 244. Within the application 208, the event consumer 246, which constantly polls the message queue 174, will see that a new match ID has been persisted. That match ID will then be pulled (block 210), push to local ephemeral storage (block 212), the associations are made (block 214), and then eventually persisted (block 218) into the graph database 180.

Figure 11:
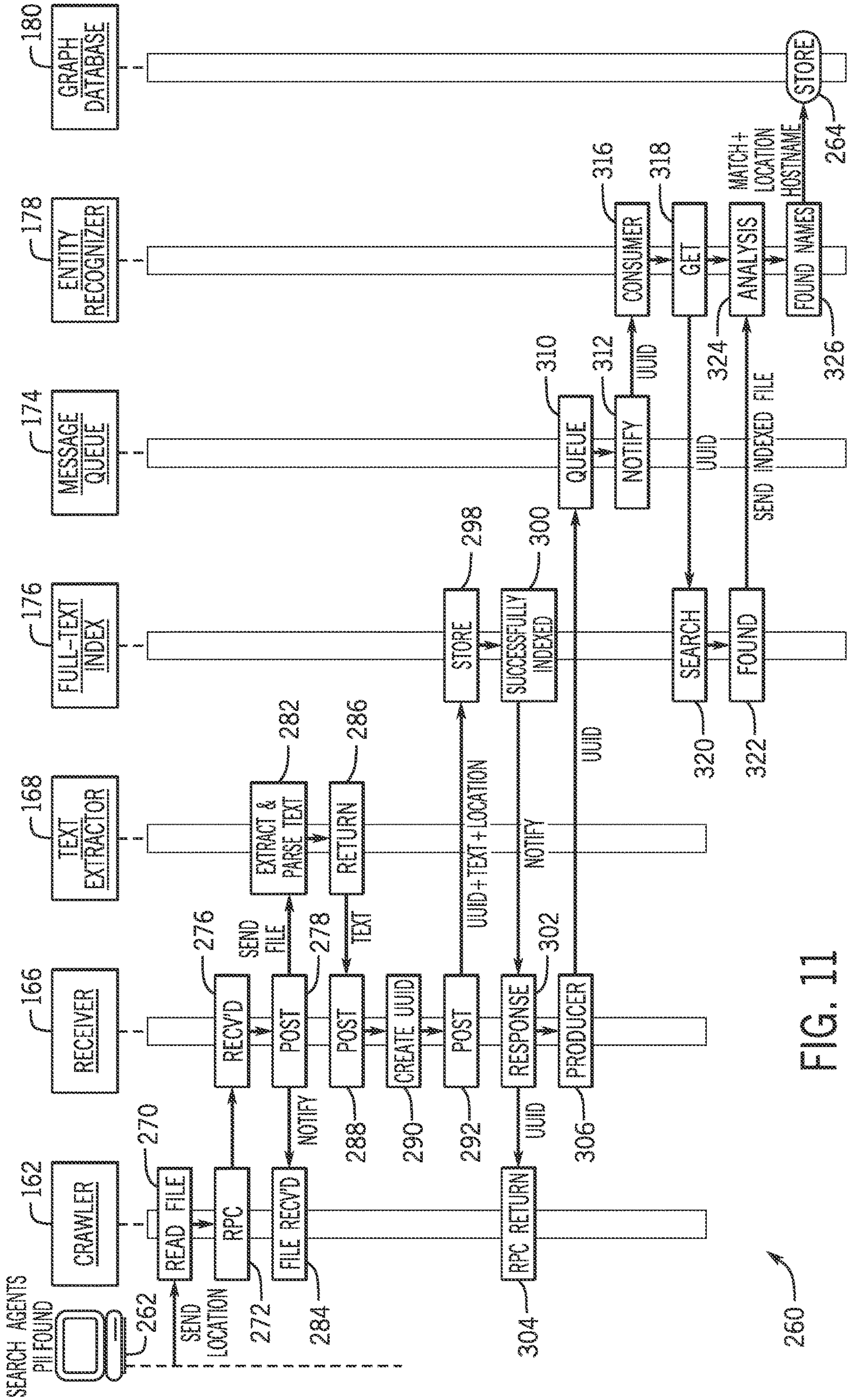
FIG. 11 represents an event-based view of data as it flows through the components of FIG. 10 for identity association in accordance with one embodiment.

By way of further example, FIG. 11 shows an event-based view 260 of data as it flows through the components shown in FIG. 10. These events flow from an initiating event (represented by computer 262), such as the discovery of PII at a location, and concludes with the storage (block 264) of entity and location information in a graph database 180. Although the depicted data flow concludes with storage at block 264, other flows may work with stored information and may be initiated by other events. When PII is found by external agents, the crawler 162 is notified that it should search this location for additional identifying entities. The crawler 162 then reads this file (block 270) and sends it to a remote location via remote procedure call (block 272). When the remote process receives (block 276) the data, it posts (block 278) the data to a text extraction process (block 282). It may also notify (block 284) the crawler 162 of the work in progress. The extraction process is responsible solely for preprocessing. It prepares documents for analysis. If it successfully extracts text or other relevant data, such as images, it returns (block 286) these to the receiver process.

In FIG. 11, when the receiver gets analyzable entities back from posting (block 288) to the preprocessor, it creates a unique identifier for the document data (block 290). It posts these (block 292) to the full-text index 176 for it to store (block 298). These data are stored in the long term, such as for both human retrieval and analysis by software agents. If the document and identifier are stored successfully (block 300), the receiver 166 may respond (block 302) by placing the unique identifier on a queue (blocks 306 and 310). The queue holds unique identifiers and notifies (block 312) consumers 316 that new documents are available for processing. Optionally, the receiver may return (block 304) status to the crawling process about the success or failure of storing the document data. When the consumer receives notification, it gets (block 318) the identified document from the full-text index 176. The index 176 searches (block 320) for the document and, if found (block 322), sends the full data to the entity recognizer process for analysis (block 324). If identifying entities are found (block 326) in the document body, both the document location and the discovered entities are passed to the graph database 180 to store (block 264) the result.

Figure 12:
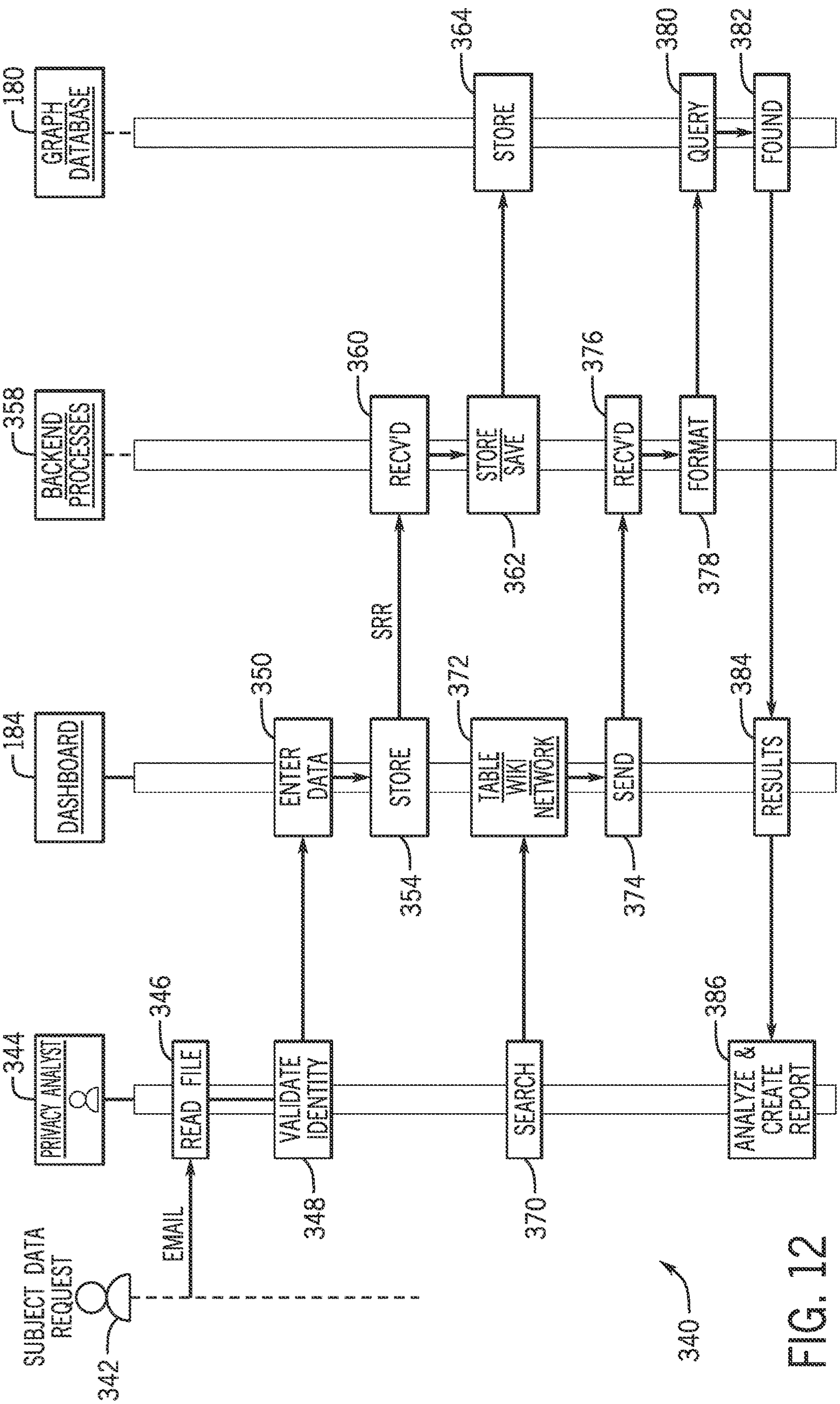
FIG. 12 is a data flow for searching for PII relevant to a subject profile in accordance with one embodiment.

FIG. 12 shows an example of a data flow 340 for searching for PII relevant to a subject profile once entities and locations have been stored in the graph database 180. In this case, the initiating event is a subject rights request from a person 342 (which may also be referred to as a subject) for information about themselves. An analyst 344 within the organization may receive this request through a medium (e.g., via e-mail or a specialized application), read the request (block 346), and load the request into the system. The analyst 344 can determine if the subject 342 is a valid requester for this data (block 348). This may be done externally through a set of challenge collection, which may use data known by the organization about the subject. If the subject is valid, the collected subject data (block 350) is entered into the system via dashboard 184. The collected subject data may include one or more items of PII that help uniquely identify the subject. The system stores this data (block 354) by sending it to the back end 358. The data stored may include the one or more items of PII (e.g., PII provided by the subject) and details of the subject rights request (e.g., a Subject Rights Request (SRR) under the CCPA or a Data Subject Access Request (DSAR) under the GDPR). When the back end 358 receives the data (block 360), it formats and stores the data in the graph database 180 (blocks 362 and 364).

The analyst 344 may then operate the system to search (block 370) for data related to the subject 342. Through the dashboard 184, the analyst 344 may request search results in various formats (block 372). These formats may include: a tabular view, which may include relevancy; a wiki view, which may allow the analyst to navigate the results as one would navigate a wiki document system; or a network visualization, such as a constellation graph or other graphical representation, which may allow the analyst to get a "top down" overview of documents and entities related to the subject 342. This request is sent (block 374) to the back end 358. Upon receipt (block 376), it requests data related to the subject 342 as found in the subject's data stored in block 364. How the back end 358 processes and formats (block 378) this data depends on the type of request the analyst 344 made. The back end 358 sends the formatted query (block 380) to the database 180. If the database finds results (block 382), it passes these back to the back end 358 and then the front end (dashboard 184), which displays the results (block 384) in a format compatible with the initially requested view. The analyst 344 may then operate on these results (block 386), either reporting on them, ignoring them if they are not needed, or returning to either the search (block 370) or enter data (block 350) steps to expand the search for results relevant to the subject 342.

Figure 13:
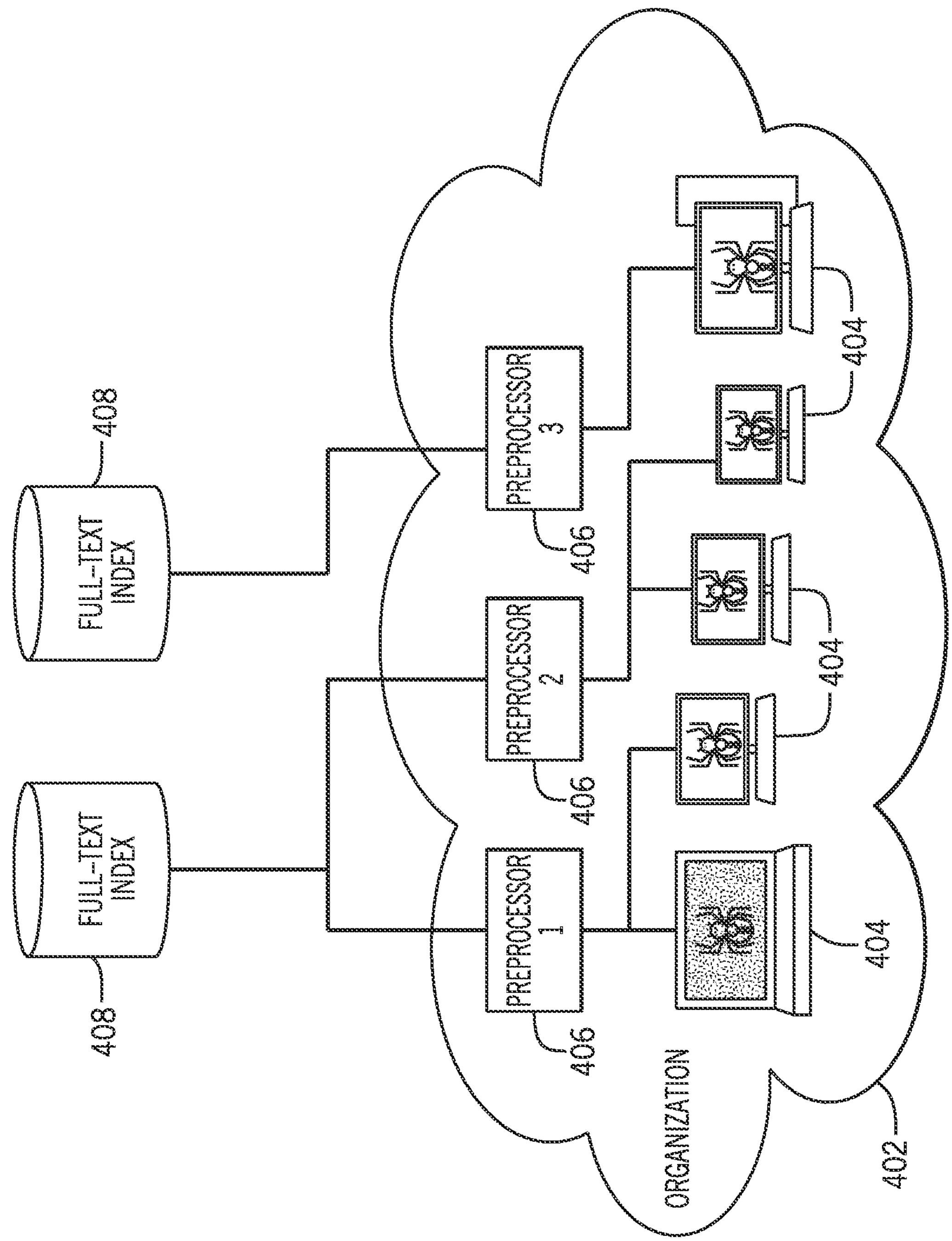
FIG. 13 generally depicts data ingestion within an organization in accordance with one embodiment.

FIG. 13 shows an example of data ingestion within an organization 402. As depicted, crawlers (e.g., crawler 162) may be distributed across many workstations and servers 404. These crawlers concentrate data into remote computers 406 for heavier processing. These, in turn, concentrate the processed data further into a set of full-text indices 408 (e.g., full-text index 176). The concentrators may be geographically distributed. An organization may separate components to improve bandwidth usage efficiency.

Figure 14:
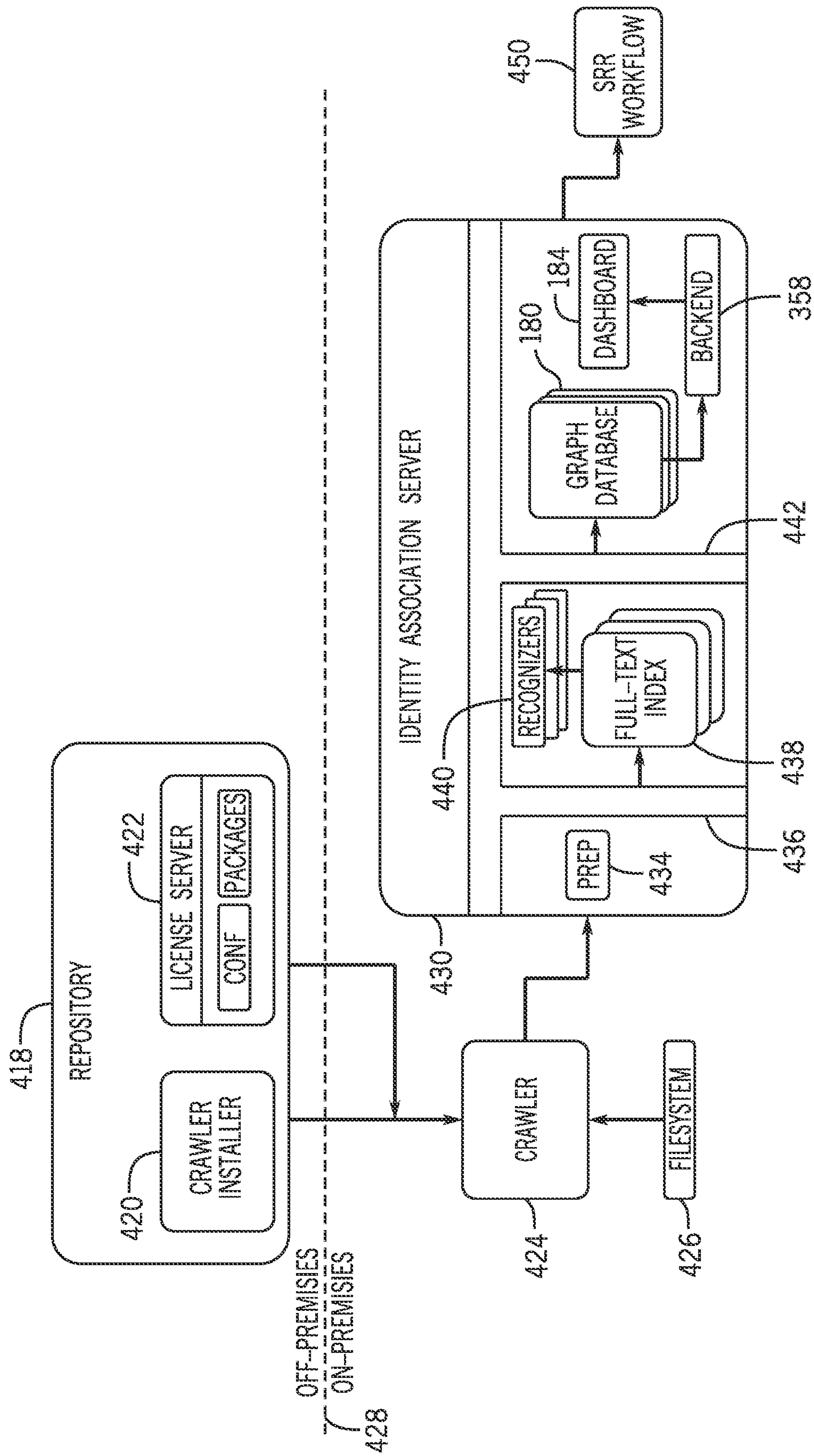
FIG. 14 generally depicts components of an identity association system separated by potential geographic and data locality in accordance with one embodiment.

As generally depicted in FIG. 14, an endpoint crawler 424 can be initially installed from a central repository 418 via installer 420. The crawler 424 may be the same as or different than the crawler 162. The central repository 418 system, or another system, can contain a license server 422 with license and configuration details and packages for the organization 402. The crawler 424 itself may run on hardware local to the data (e.g., file system 426) to be searched. However, such systems may be used for tasks other than preprocessing and identity recognition, so the crawler 424 can transfer results to a nearby system (e.g., server 430) for processing. In at least some instances, a preprocessor 434 (such as a preprocessor 406 of FIG. 13) operates on the received data. This preprocessor 434 may be co-located with other processors. However, it may be partitioned (by partition 436) and run more locally to the data to improve bandwidth efficiency. This could be on the same host where the data is located, or on some intermediary host.

Full-text storage 438 and entity recognition 440 tasks are closely associated and may be partitioned together between partitions 436 and 442. In other instances, however, the full-text storage 438 and entity recognition 440 tasks are split and parallelized. The output of entity recognition 440 is much smaller than full text and may consist only of entities and locations, so transferring this consumes less bandwidth. Thus, the graph database 180 may be located in a more convenient or centralized location. This database 180 may also be clustered to improve scalability.

The graph database 180, back end 358, and dashboard 184 may be centrally located. The dashboard 184 is the interface for an analyst 344 and in at least some instances is accessible to the analyst 344 from wherever the analyst 344 works in the organization 402. The dashboard 184 facilitates processing of a subject rights request as discussed elsewhere herein and generally represented in FIG. 14 by reference numeral 450. The back end 358 is responsible for search relevancy and shuttling of data between database and front end, so co-location of the graph database 180, the back end 358, and the dashboard 184 may be beneficial. In FIG. 14, the file system 426 and server 430 are shown on-premises for the organization 402 while the repository 418 is shown off-premises, with demarcation between on-premises and off-premises generally represented by dashed line 428. But the location of the various systems and processes described herein may vary and may be located either on-premises or off-premises in full accordance with the present techniques.

Figure 15:
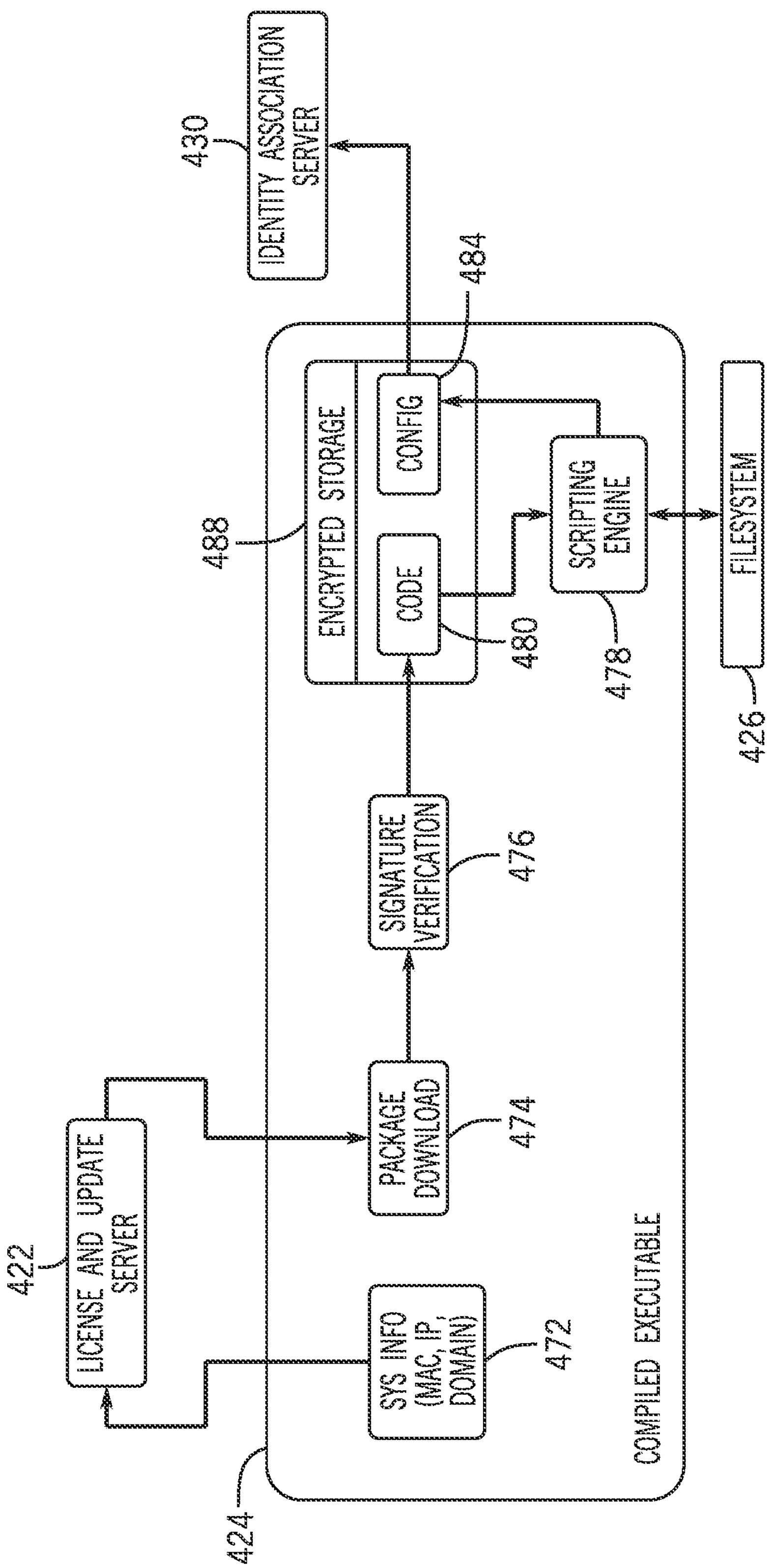
FIG. 15 generally depicts additional details of an endpoint crawler that may be used to search for PII or other sensitive data in accordance with one embodiment.

FIG. 15 generally depicts crawler 424 internals and how it bootstraps tasks. In this depicted embodiment, the crawler 424 starts by using information 472 it knows about itself (e.g., MAC and IP address) and it communicates with the license server 422 to confirm authority to search (block 474). Once it has verified this authority (block 476), it proceeds to scan based on instructions, such as external commands and environment variables (e.g., via scripting engine 478 and code 480) detailing locations (e.g., file system 426) to crawl. It uses configuration instructions 484 to determine where to send resulting data (e.g., to identity association server 430). Any locally stored configuration may be encrypted in encrypted storage 488.

Figure 16:
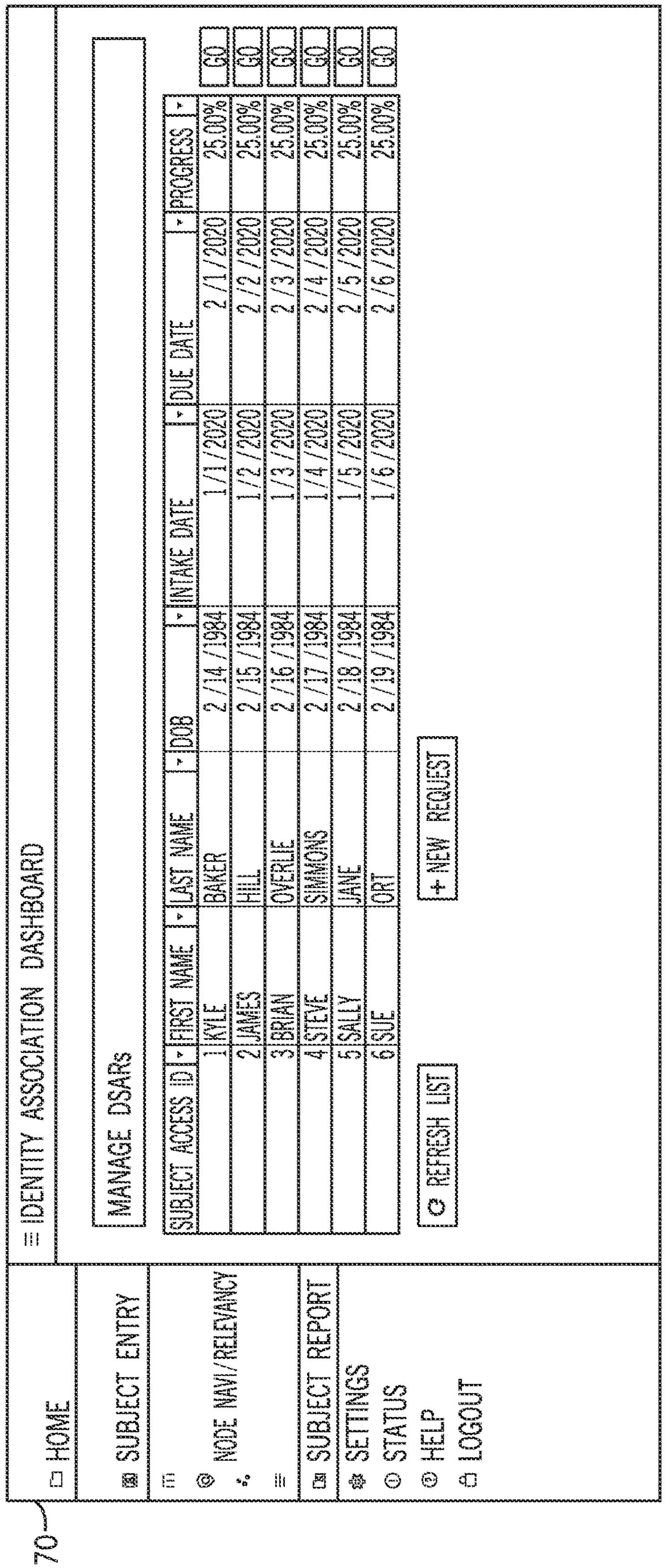
FIGS. 16-23 depict examples of various screens that may be provided to a user by an identity association dashboard in accordance with one embodiment.

FIGS. 16-23 are examples of various screens 70 that may be displayed to an analyst 344 or other human user via an identity association dashboard 184. Screens 70 can include any suitable elements for displaying data and facilitating user-interaction with the dashboard 184. As shown in FIG. 16, for instance, a screen 70 (e.g., a dashboard home screen) includes a listing of subject rights requests (e.g., DSARs or SRRs) for identity association, showing each subject rights request (which may also be referred to as a subject access request) for a subject 342 as a row in a table with relevant information in each column. In FIG. 16, this relevant information includes subject access identification number, first name, last name, date of birth, intake date, due date, and progress, but additional or other items of information may be provided in the table. This screen allows a user to begin a new subject rights request and work on existing requests. A user can navigate from this screen to an individual subject rights request, such as by clicking the virtual "GO" button at the end of the row of the desired individual subject rights request. The screen 70 may include a navigation menu (e.g., the vertical menu on the left side of screen 70) to facilitate navigation between various dashboard screens 70.

Figure 17:
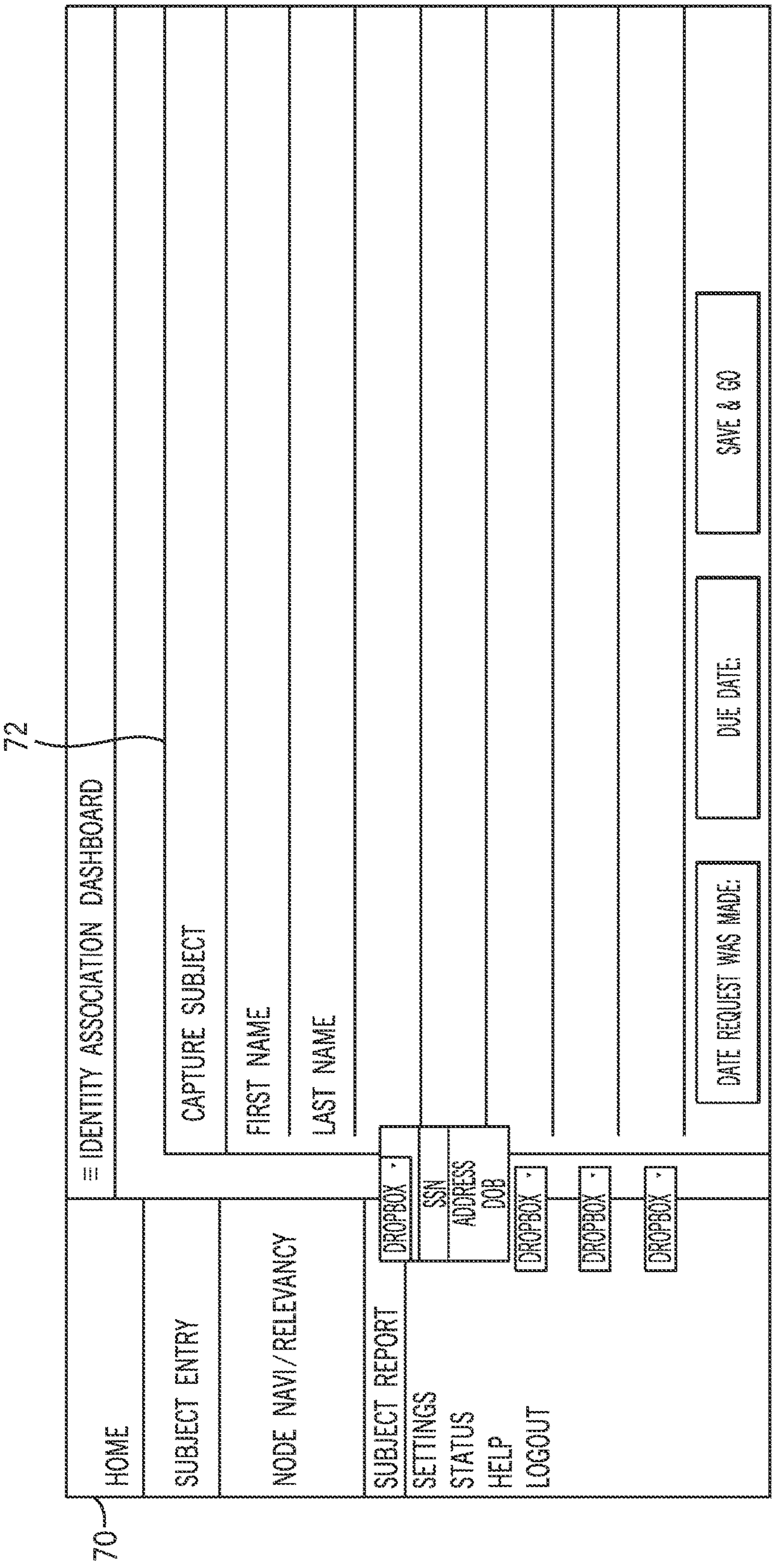

FIG. 17 shows a dashboard screen 70 providing for entry of PII for a subject 342 into a profile 72. Any suitable PII elements of a subject 342 may be entered via the data capture screen of FIG. 17. Non-limiting examples of suitable PII elements include names, social security number, addresses, date of birth, account numbers, credit card numbers, and other forms of PII listed herein. Dropdown menus allow a user to specify the type of PII entered into a particular field.

Figure 18:
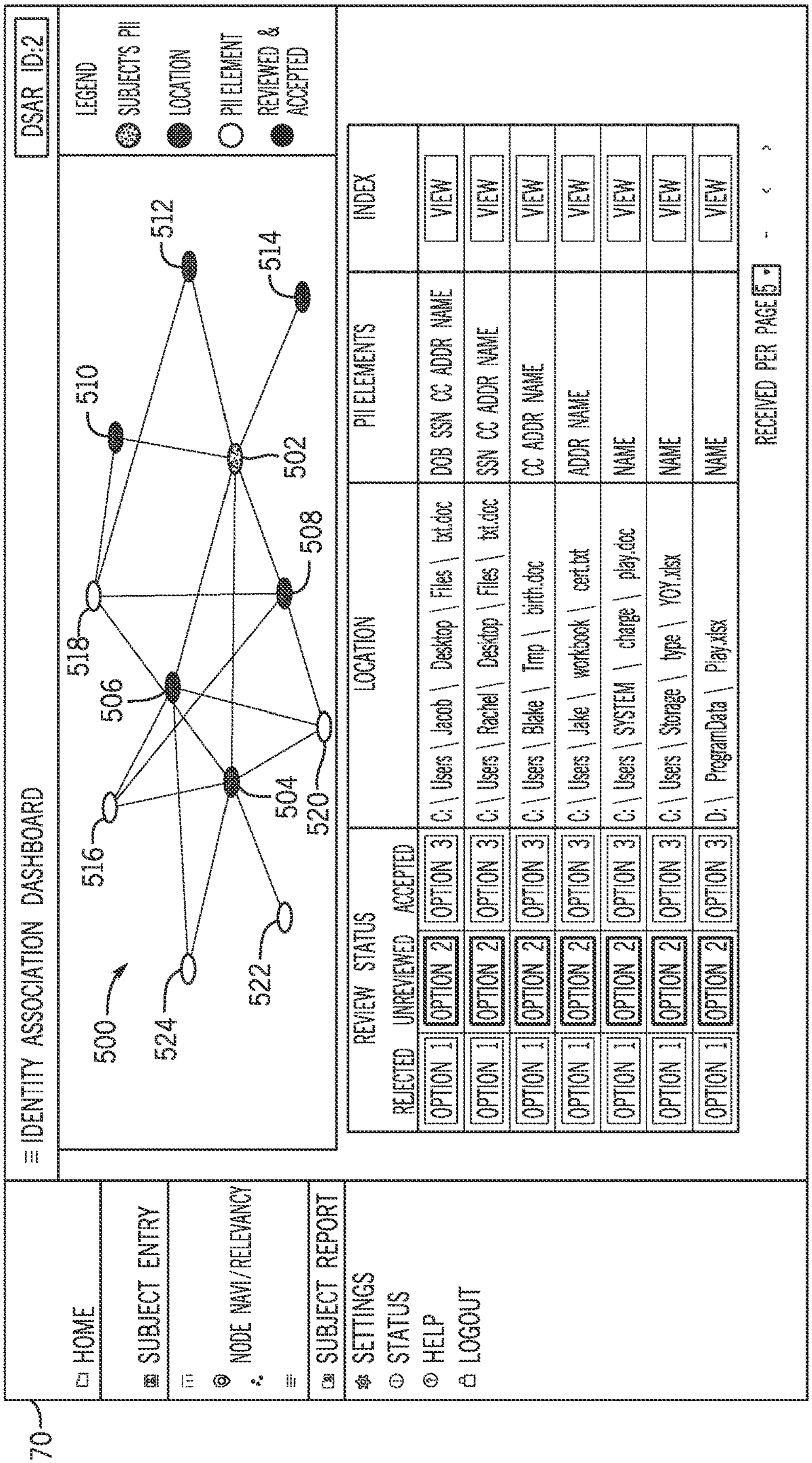

FIG. 18 is a relevancy view screen showing the locations and PII elements associated with a subject 342. The screen 70 depicted in FIG. 18 includes an example of a constellation graph 500 that visually depicts PII elements and locations, although the PII elements and locations may be listed in some other graphical or non-graphical form (e.g., text) in other instances. In graph 500, unique PII elements known to be related to the subject 342 (such as initial PII provided by the subject 342 with a subject rights request and used as one or more data subject search terms for searching a PII database) are represented by lightly stippled nodes (e.g., node 502), and files/locations containing these PII elements known to be related to the subject 342 are represented by heavily stippled nodes (e.g., nodes 504, 506, 508, 510, 512, and 514). Further, PII elements that are found within these files/locations and that are possibly (but not necessarily) related to the subject 342 are represented by open nodes (e.g., nodes 516, 518, 520, 522, and 524). Lines connecting nodes in the graph 500 represent links between the PII elements and locations. The table view below the graph 500 shows the files/locations (which may be represented in the graph 500 by heavily stippled nodes) along with the subject's PII elements (which may be represented in the graph 500 as lightly stippled nodes). In one embodiment, the node 502 represents a name of the data subject 342, and the nodes 516, 518, 520, 522, and 524 represent other data that might be related to the subject, such as a potential: date of birth, social security number, address, phone number, credit card number, or other PII element noted herein. In some instances, the graph 500 may include textual labels or other annotations next to the nodes to convey additional information to a user (e.g., the PII element or location represented by each node). The View button allows a user to see the full text, or a portion of the text, of the file/location noted in that row of the table.

Figure 19:
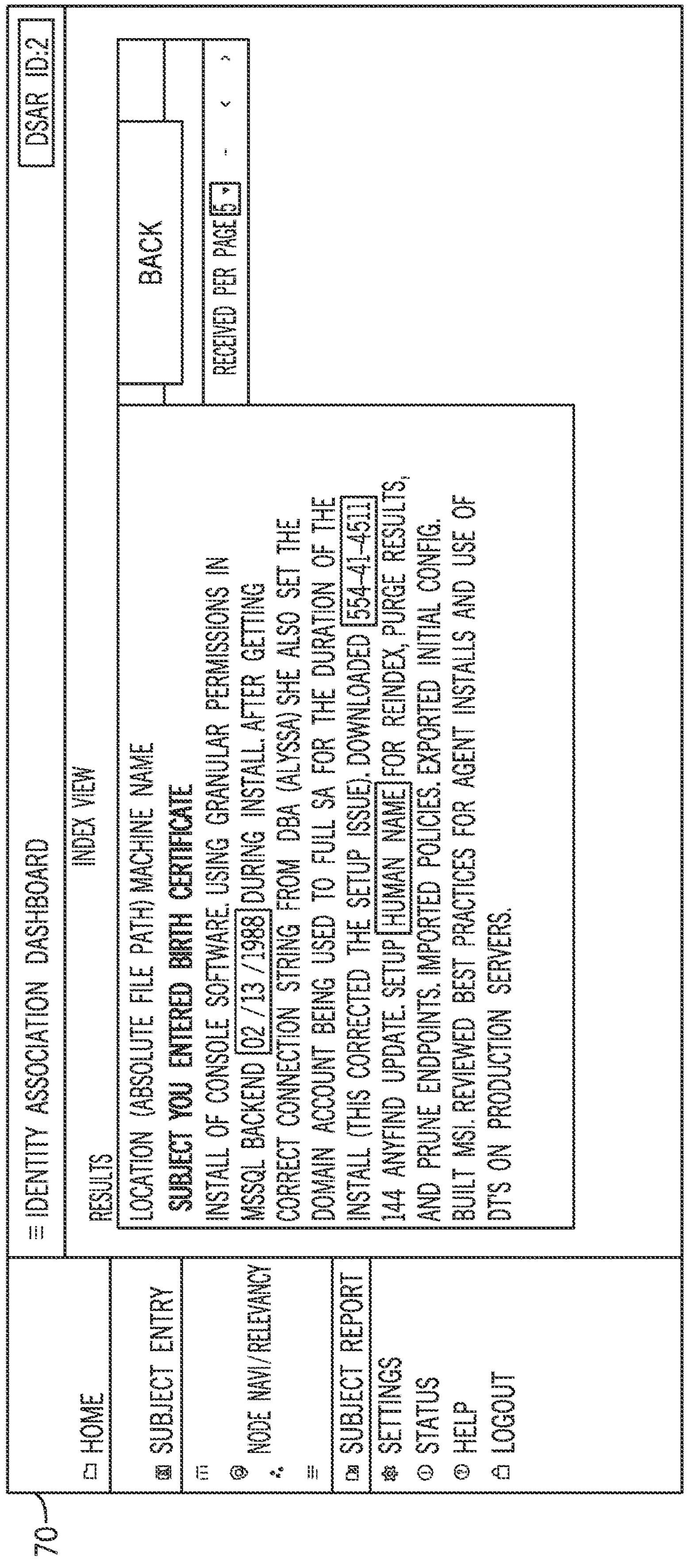

FIG. 19 is an example of a screen 70 to show a text view of a file (document) if a user clicked the View button on the page prior shown in FIG. 18. In at least some instances, the full text of the selected file is shown to a user with PII elements potentially related to the subject (e.g., one or more elements represented by nodes 516, 518, 520, 522, or 524) shown in context and highlighted within the text. In other instances, a smaller portion of the text of the selected file may be shown to the user with the PII elements potentially related to the subject shown in context and highlighted within the text.

Figure 20:
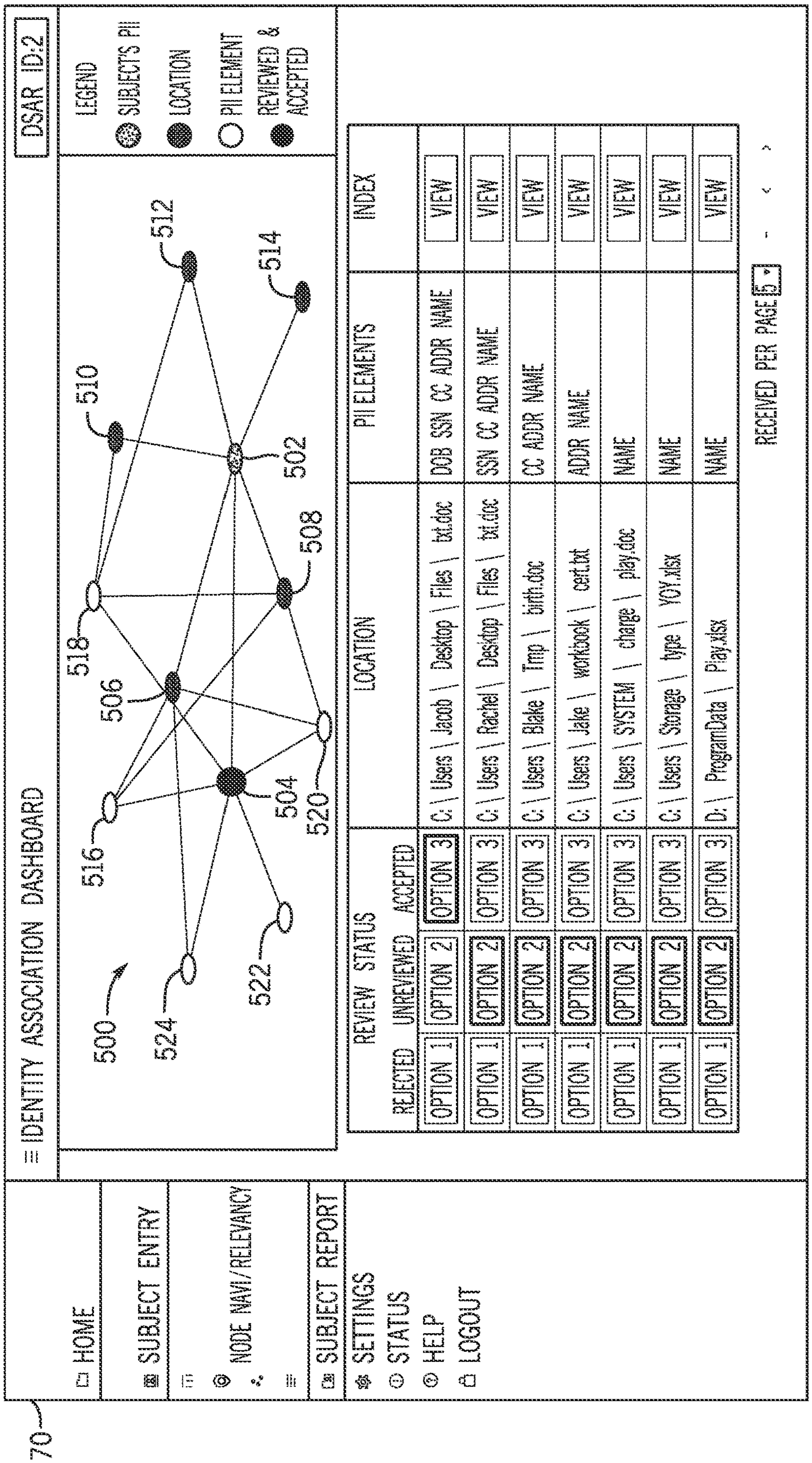

A user may review files/locations potentially related to the subject (e.g., the PII elements of nodes 516, 518, 520, 522, and 524) and either accept or reject a file/location as being related to the subject 342. FIG. 20 shows the relevancy view screen 70 of FIG. 18 after the file/location represented by node 504 has been reviewed and accepted as being related to the subject 342. In one embodiment, an analyst 344 reviews the file (e.g., in a review screen such as that shown in FIG. 19) and accepts the file/location by clicking a corresponding button (e.g., "Option 3" in the row corresponding to the reviewed file/location in FIG. 20.) Once a file/location is "accepted," the corresponding node (e.g., node 504) in graph 500 would update (to a closed/solid node in FIG. 20) to show this file/location has been reviewed and accepted and the file/location (or the instance of PII in the file/location) may be added to a data subject profile. While nodes of the various graphs herein are depicted as being open, lightly stippled, heavily stippled, or closed/solid, it will be appreciated that these nodes may in practice be distinguished in other or additional ways, such as by variations in color or shape.

Figure 21:
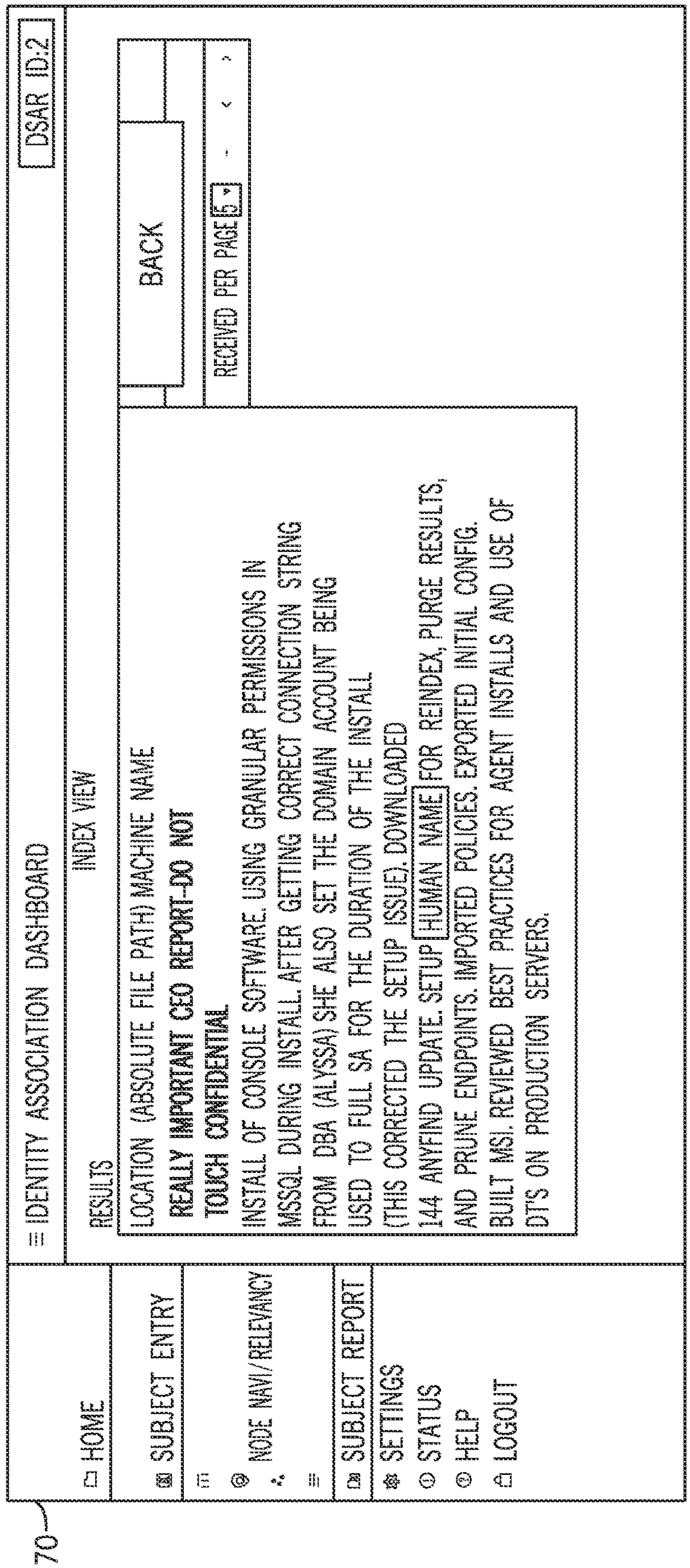
Figure 22:
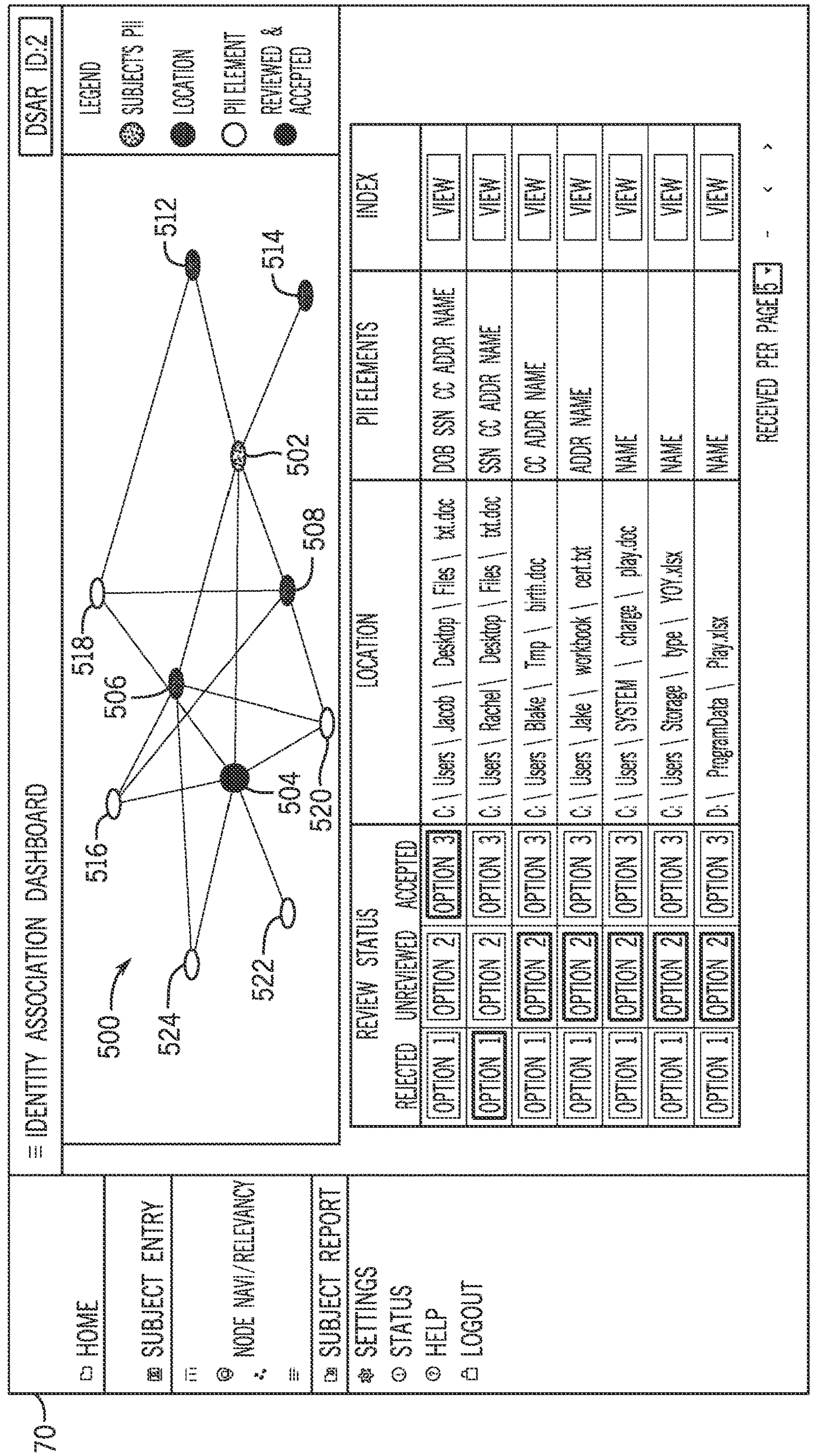

FIG. 21 is similar to FIG. 19 but is an example of a screen 70 showing the text (full or partial) of a file/location (e.g., the file/location represented by node 510) that would not be "accepted" but which might show up as being potentially relevant to the subject 342. FIG. 22 is the relevancy view shown in FIG. 20, but where the file/location represented by node 510 has been "rejected" after review of the full or partial text in the file/location. The node 510 corresponding to the file/location which has been "rejected" (e.g., by an analyst clicking a button ("Option 1") in the row corresponding to the file/location) may be removed from the graph 500.

Figure 23:
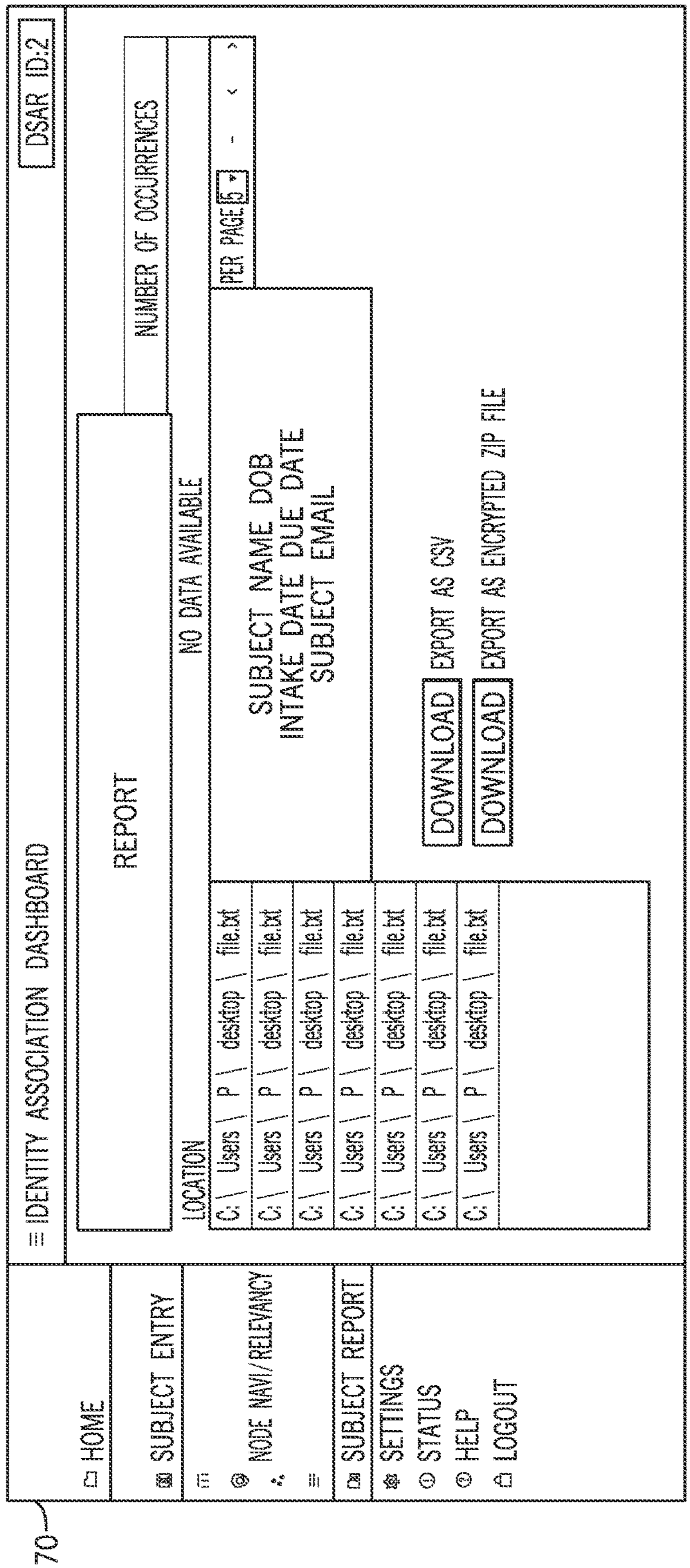

FIG. 23 is an example report showing a list of all files/locations that have been "accepted" for final review, along with the subject's name, other identifying information, intake date, and due date. The analyst 344 or other user may export that report information in a secure manner, such as by clicking one of the "download" buttons.

Figure 24:
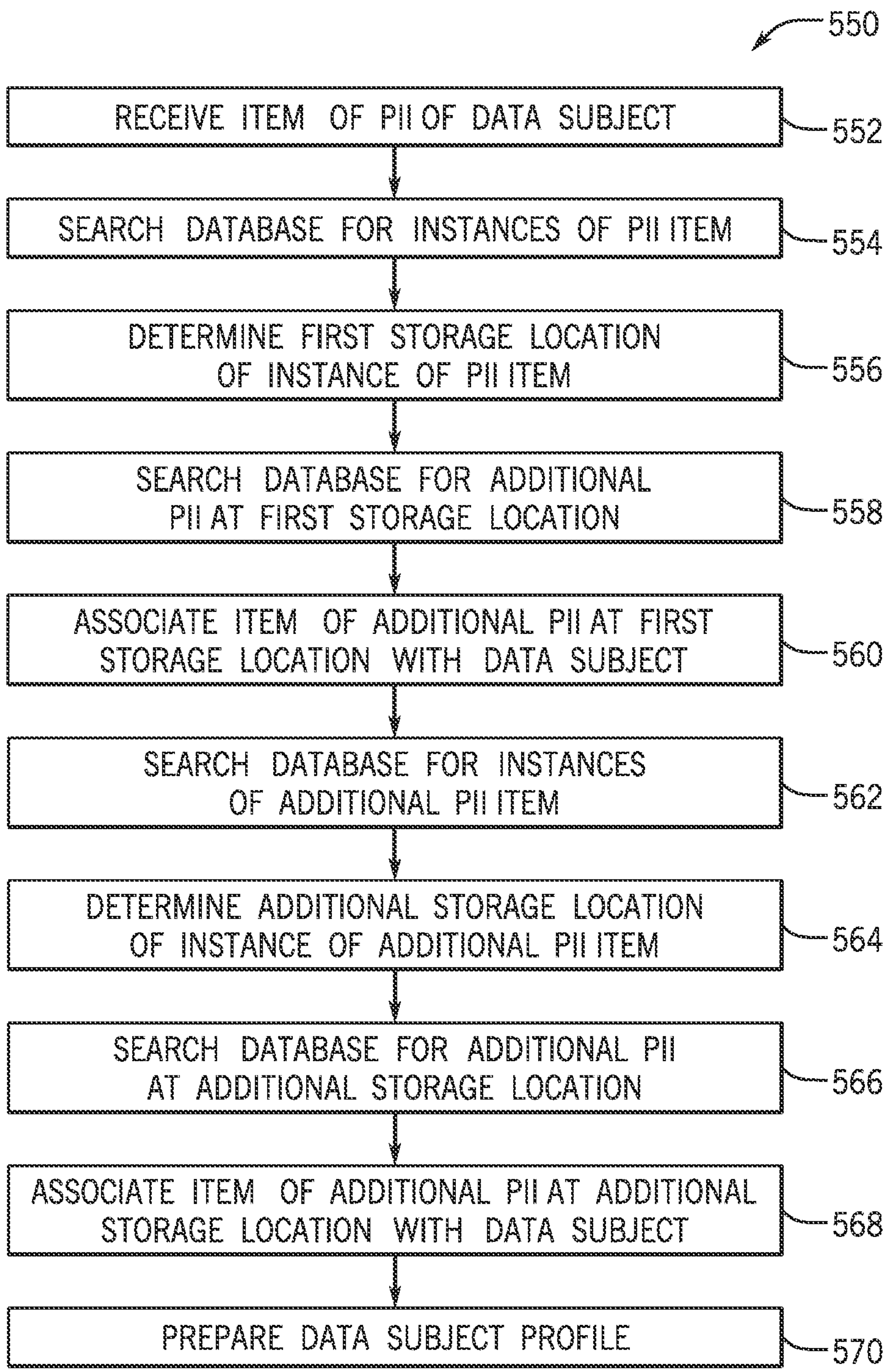
FIG. 24 is a flowchart representing a method for preparing a subject profile in accordance with one embodiment.

From the above description, it will be appreciated that a data subject profile may be prepared in one embodiment according to a method generally represented by flowchart 550 in FIG. 24. In this depicted embodiment, the method includes receiving (block 552) a specific item of PII of a data subject (e.g., subject 342). Receiving the specific item of PII can include receiving one or more items that, individually or collectively, uniquely identify the data subject. This may include, for example, receiving one or more of a biometric identifier (e.g., a fingerprint) or social identifier (e.g., the subject's name, address, phone number, date of birth, license number, passport number, credit card number, account number, social security number, password, or e-mail address). In some instances, the specific item of PII may be received with a subject rights request initiated by the data subject or by some other person. The identity of the person initiating the subject rights request may be validated, such as described above.

The method also includes searching a database of PII held by an organization for instances of that specific item of PII (block 554). The database of PII can be created in any suitable manner, such as those described above. This may include discovering PII held within an organizational computer network and creating a searchable database (e.g., database 180) in which each item of discovered PII is mapped to a storage location at which that item of discovered PII is stored.

The method also includes determining a first storage location (block 556) within the organizational computer network of an instance of the specific item of PII of the data subject found during the searching of block 554, and then searching the database of PII (block 558) to find additional PII held at the first storage location. Once found, any specific item of additional PII held at the first storage location can be associated with the data subject (block 560), such as through the techniques described above. In some instances, this association may include presenting one or more specific items of additional PII held at the first storage location to a human user and, in response to input from the human user, associating the one or more specific items of additional PII held at the first storage location with the data subject. Presenting the one or more specific items of additional PII held at the first storage location may also include displaying at least a portion of a file of the first storage location to show a specific item of additional PII in context within the file (i.e., in situ).

Further, the method includes searching (block 562) the database for instances of a specific item of additional PII found in block 558. In some instances, this searching (block 562) may be performed after the association (block 560) of the additional PII found in block 558 to a data subject. In other instances, however, the searching of block 562 is performed before the association of block 560.

The method also includes determining (block 564) an additional storage location of such an instance of the specific item of additional PII found from the searching of block 562 and then searching the database of PII (block 566) to find additional PII held at the additional storage location. Once found, any specific item of additional PII held at the additional storage location can be associated with the data subject (block 568), such as through the techniques described above. Like the association of block 560, this association (block 568) may include presenting one or more specific items of additional PII held at the additional storage location to a human user and, in response to input from the human user, associating the one or more specific items of additional PII held at the additional storage location with the data subject. Presenting the one or more specific items of additional PII held at the additional storage location may also include displaying at least a portion of a file of the first storage location to show a specific item of additional PII in context within the file (i.e., in situ).

A data subject profile may be prepared (block 570) with the received specific item of PII of the data subject (from block 552), the specific item of additional PII held at the first storage location and associated (in block 560) with the data subject, and the specific item of additional PII held at the additional storage location and associated (in block 568) with the data subject. This preparation of the data subject profile may include creating a new data subject profile or updating a previous data subject profile (e.g., supplementing a data subject profile by adding at least one of the above PII items). The data subject profile, or information therefrom, may be output for further use, such as in a report provided to the data subject in response to a subject rights request received by an organization from the data subject.

More generally, the searching, determining, and associating of flowchart 550 may be performed in any suitable order and for any suitable number of PII elements and instances. In at least some embodiments, these may be performed iteratively for multiple specific items of PII received or found (e.g., from blocks 552, 558, 566) and multiple instances of these PII items found (e.g., from blocks 554 and 562). Each item of PII found during the searching may be used to search for other locations having instances of the PII item, which may lead to other PII of potential relevance to a data subject at the other locations, as described above. Additionally, the term "specific item" of PII is used herein to denote a discrete PII item and does not require any specific type or form of PII data entity.

Figure 25:
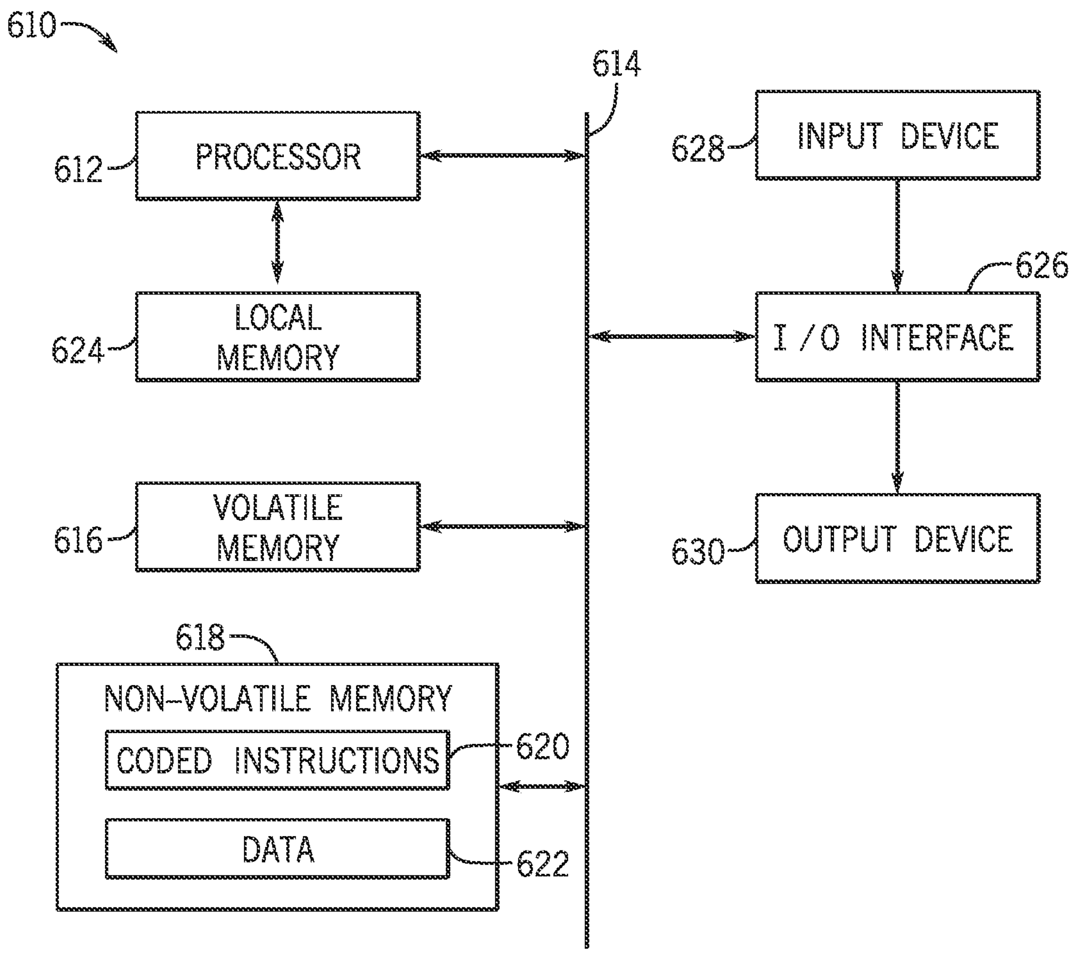
FIG. 25 is a block diagram of components of a programmed computer system for facilitating preparation of a subject profile in accordance with one embodiment.

Finally, those skilled in the art will appreciate that a computer can be programmed to facilitate performance of the above-described processes. One example of such a computer is generally depicted in FIG. 25 in accordance with one embodiment. In this example, a computer system 610 includes a processor 612 connected via a bus 614 to volatile memory 616 (e.g., random-access memory) and non-volatile memory 618 (e.g., flash memory and a read-only memory (ROM)). Coded application instructions 620 and data 622 are stored in the non-volatile memory 618. For example, the application instructions 620 can be stored in a ROM and the data 622 can be stored in a flash memory. The instructions 620 and the data 622 may be also be loaded into the volatile memory 616 (or in a local memory 624 of the processor) as desired, such as to reduce latency and increase operating efficiency of the computer 610. The coded application instructions 620 can be provided as software that may be executed by the processor 612 to enable various functionalities described herein. Non-limiting examples of these functionalities include searching for PII, associating PII with a data subject, preparing a data subject profile, and generating a report with information from the data subject profile, such as described above. In at least some embodiments, the application instructions 620 are encoded in a non-transitory computer readable storage medium, such as the volatile memory 616, the non-volatile memory 618, the local memory 624, or a portable storage device (e.g., a flash drive or a compact disc).

An interface 626 of the computer system 610 enables communication between the processor 612 and various input devices 628 and output devices 630. The interface 626 can include any suitable device that enables this communication, such as a modem or a serial port. In some embodiments, the input devices 628 include the wireless acquisition front end of FIG. 10 and a keyboard and a mouse to facilitate user interaction, while the output devices 630 include displays, printers, and storage devices that allow output of data received or generated by the computer system 610. Input devices 628 and output devices 630 may be provided as part of the computer system 610 or may be separately provided. It will be appreciated that computer system 610 may be a distributed system, in which some of its various components are located remote from one another, in some instances.

Certain examples of systems and methods for finding and associating PII to a data subject are described above and may be used to facilitate compliance with various data privacy laws and regulations. But it will be appreciated that the presently disclosed techniques may be used in other applications, such as for protecting trade secrets or other confidential information, or to facilitate compliance with other laws or regulations (e.g., the International Traffic in Arms Regulations (ITAR)). For instance, rather than finding and associating PII, the present techniques may be used to find and associate other forms of information deemed (e.g., by a company or government) to be sensitive. Examples of other forms of sensitive information may include technical information, such as items of research and engineering data, engineering drawings, and associated lists, specifications, standards, process sheets, manuals, technical reports, technical orders, catalog-item identifications, data sets, studies and analyses and related information, and computer software executable code and source code. In some instances, keywords may be used to identify sensitive documents. In another instance, a document with a combination of a schematic and a set of words related to a project may be identified as sensitive. An initial search may find certain sensitive information or documents at one or more locations. The sensitive information or documents may be associated with other potentially sensitive information or documents at other locations, such as described above for PII. And the interactive dashboard described above may be used by an analyst to explore, discover, and review potentially sensitive information or documents in accordance with the present techniques.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A computer-implemented method comprising:

receiving a specific item of personal identifying information (PII) of a data subject;

using the received specific item of PII of the data subject, searching a database of PII held by an organization for instances of the specific item of PII of the data subject, wherein the database of PII identifies storage locations in which PII is held within an organizational computer network;

determining a first storage location within the organizational computer network of an instance of the specific item of PII of the data subject found during the searching of the database of PII;

searching the database of PII to find additional PII held at the first storage location;

associating a specific item of additional PII held at the first storage location with the data subject, wherein the specific item of additional PII held at the first storage location is different than the received specific item of PII of the data subject, and wherein associating the specific item of additional PII held at the first storage location with the data subject includes:

displaying multiple items of additional PII held at the first storage location in an interactive dashboard, the multiple items of additional PII held at the first storage location including the specific item of additional PII held at the first storage location, wherein the interactive dashboard depicts the first storage location and the multiple items of additional PII held at the first storage location as nodes in a constellation graph, the interactive dashboard depicts links between the first storage location and the multiple items of additional PII held at the first storage location in the constellation graph, and the interactive dashboard also includes a table view that lists the first storage location and the multiple items of additional PII held at the first storage location;

allowing a human user to indicate, via the interactive dashboard, acceptance or rejection of individual items of the multiple items of additional PII as being associated with the data subject; and based on the human user indicating acceptance of the specific item of additional PII held at the first storage location, associating the specific item of additional PII held at the first storage location with the data subject and changing the appearance of the constellation graph in the interactive dashboard in response to the human user indicating acceptance of the specific item of additional PII held at the first storage location as being associated with the data subject;

using the specific item of additional PII held at the first storage location and associated with the data subject, searching the database of PII for instances of the specific item of additional PII held at the first storage location;

determining a second storage location within the organizational computer network of an instance of the specific item of additional PII held at the first storage location;

searching the database of PII to find additional PII held at the second storage location;

associating a specific item of additional PII held at the second storage location with the data subject, wherein the specific item of additional PII held at the second storage location is different than the specific item of additional PII held at the first storage location and the received specific item of PII of the data subject; and preparing a data subject profile including: the received specific item of PII of the data subject, the specific item of additional PII held at the first storage location and associated with the data subject, and the specific item of additional PII held at the second storage location and associated with the data subject.

2. The method of claim 1, wherein receiving the specific item of PII of the data subject includes receiving the specific item of PII of the data subject with a subject rights request initiated by a person.

3. The method of claim 2, comprising validating an identity of the person who initiated the subject rights request.

4. The method of claim 1, wherein receiving the specific item of PII of the data subject includes receiving one or more items that, individually or collectively, uniquely identify the data subject.

5. The method of claim 4, wherein receiving the specific item of PII of the data subject includes receiving one or more of a social identifier or biometric identifier of the data subject.

6. The method of claim 5, wherein receiving the specific item of PII of the data subject includes receiving at least one social identifier that includes one or more of: a name, address, phone number, date of birth, license number, passport number, credit card number, account number, social security number, password, or e-mail address.

7. The method of claim 1, comprising creating the database of PII.

8. The method of claim 7, wherein creating the database of PII includes discovering PII held within the organizational computer network and creating a searchable database in which each item of discovered PII is mapped to a storage location at which that item of discovered PII is stored.

9. The method of claim 1, comprising displaying at least a portion of a file to show the specific item of additional PII in context within the file.

10. The method of claim 1, wherein associating the specific item of additional PII held at the second storage location with the data subject includes:

presenting the specific item of additional PII held at the second storage location to the human user; and in response to input from the human user, associating the specific item of additional PII held at the second storage location with the data subject.

11. The method of claim 1, wherein preparing the data subject profile includes creating a new data subject profile or updating a previous data subject profile.

12. An apparatus comprising:

a processor-based computer system including a memory and a processor, the memory having computer-readable instructions that, when executed, cause the computer system to:

receive a data subject search term provided by a human user to facilitate response to a subject rights request pertaining to a data subject;

search a database of sensitive data entities and locations of the sensitive data entities within an organizational computer network for instances of the data subject search term provided by the human user;

output a graphical representation of search results to the human user, the graphical representation including a constellation graph depicting the data subject search term linked to locations in which the data subject search term is stored and depicting sensitive data entities, other than the data subject search term, linked to the locations in which the data subject search term is stored, wherein the data subject search term, the locations in which the data subject search term is stored, and the sensitive data entities are depicted as nodes in the constellation graph, wherein links between the locations and the data subject search term and links between the locations and the sensitive data entities are depicted in the constellation graph, and wherein outputting the graphical representation includes displaying an interactive dashboard having the constellation graph to the human user, the interactive dashboard also having a table view to list the locations depicted as nodes in the constellation graph, the table including indications of a human user review status for each listed location as being accepted, rejected, or unreviewed;

receive, from the human user via the interactive dashboard following output of the graphical representation, an indication of acceptance or rejection of one or more of the locations as being related to the data subject; and based on input from the human user via the interactive dashboard, change the appearance of the constellation graph in the interactive dashboard in response to the received indication of acceptance or rejection of the one or more of the locations as being related to the data subject and add at least one depicted location or sensitive data entity, other than the data subject search term, to a data subject profile of the data subject.

13. The apparatus of claim 12, wherein the memory has computer-readable instructions that, when executed, cause the computer system to output the data subject profile.

14. The apparatus of claim 12, wherein the memory is a non-volatile memory device.

15. The apparatus of claim 12, wherein the memory has computer-readable instructions that, when executed, cause the computer system to:

receive a selection from the human user of a location depicted in the constellation graph via the interactive dashboard; and in response to the received selection, display at least a portion of a file showing the data subject search term, or a sensitive data entity other than the data subject search term, in context within the file.

16. The apparatus of claim 12, wherein the database of sensitive data entities and locations of the sensitive data entities within the organizational computer network is a database of personal identifying information and locations of the personal identifying information within the organizational computer network.

17. A non-transitory computer-readable medium encoded with instructions that, when executed by a processor of a computer system, cause the computer system to:

receive a data subject search term provided by a human user to facilitate response to a subject rights request pertaining to a data subject;

search a database of sensitive data entities and locations of the sensitive data entities within an organizational computer network for instances of the data subject search term provided by the human user;

output a graphical representation of search results to the human user, the graphical representation including a constellation graph depicting the data subject search term linked to locations in which the data subject search term is stored and depicting sensitive data entities, other than the data subject search term, linked to the locations in which the data subject search term is stored, wherein the data subject search term, the locations in which the data subject search term is stored, and the sensitive data entities are depicted as nodes in the constellation graph, wherein links between the locations and the data subject search term and links between the locations and the sensitive data entities are depicted in the constellation graph, and wherein outputting the graphical representation includes displaying an interactive dashboard having the constellation graph to the human user, the interactive dashboard also having a table view to list the locations depicted as nodes in the constellation graph, the table including indications of a human user review status for each listed location as being accepted, rejected, or unreviewed;

receive, from the human user via the interactive dashboard following output of the graphical representation, an indication of acceptance or rejection of one or more of the locations as being related to the data subject; and based on input from the human user via the interactive dashboard, change the appearance of the constellation graph in the interactive dashboard in response to the received indication of acceptance or rejection of the one or more of the locations as being related to the data subject and add at least one depicted location or sensitive data entity, other than the data subject search term, to a data subject profile of the data subject.

* * * * *